(12) United States Patent
Spychalski-Merle

(10) Patent No.: US 11,986,970 B2
(45) Date of Patent: May 21, 2024

(54) TOOL HOLDER AND PIPE MACHINING TOOL

(71) Applicant: PF-Schweisstechnologie GmbH, Alsfeld (DE)

(72) Inventor: Achim Spychalski-Merle, Alsfeld (DE)

(73) Assignee: PF-SCHWEISSTECHNOLOGIE GMBH, Alsfeld (DE)

( * ) Notice: Subject to any disclaimer, the term of this patent is extended or adjusted under 35 U.S.C. 154(b) by 146 days.

(21) Appl. No.: 17/394,306

(22) Filed: Aug. 4, 2021

(65) Prior Publication Data

US 2022/0040874 A1 Feb. 10, 2022

(30) Foreign Application Priority Data

Aug. 6, 2020 (DE) .......................... 102020120792.1

(51) Int. Cl.
  *B26D 3/16* (2006.01)
(52) U.S. Cl.
  CPC .................... *B26D 3/164* (2013.01)
(58) Field of Classification Search
  CPC ...................................................... B26D 3/164
  (Continued)

(56) References Cited

U.S. PATENT DOCUMENTS 4,423,671 A * 1/1984 Murphy .................. A22C 17/12
  99/589
4,550,635 A * 11/1985 Kanayama .............. B23B 5/162
  82/128

(Continued)

FOREIGN PATENT DOCUMENTS

DE 295 16 513 U1 1/1997
DE 20117063 U1 1/2002
(Continued)

OTHER PUBLICATIONS

Extended European Search Report, dated Feb. 8, 2023, for German Patent Application No. 21190093.1. (12 pages).

*Primary Examiner* — Omar Flores Sanchez
(74) *Attorney, Agent, or Firm* — Seed IP Law Group LLP

(57) ABSTRACT

A skiving apparatus is provided for at least partial removal of the surface of an least approximately tubular body having a center axis, in particular of a plastic pipe, comprising a clamp assembly having a center axis and at least one clamp member for clamping the skiving apparatus to the tubular body, a skiving assembly comprising a skiving arm unit, a skiving knife arrangement disposed at a first end of the skiving arm unit, and a skiving arm support that connects the clamp assembly to the skiving arm unit. The skiving arm unit is connected by its first and second ends to the skiving knife arrangement and the skiving arm support and is pivotable in the common plane with the center axis of the clamp assembly in such a way that the skiving knife arrangement keeps its orientation relative to the center axis of the clamp assembly in every pivoted position of the skiving arm unit. A clamp assembly as a tool holder for a tool such as a skiving tool is also provided, for machining an approximately tubular body having a center axis, in particular a plastic pipe, having a center axis, a mandrel disposed coaxially with the center axis of the clamp assembly, and at least one clamping device disposed on the mandrel and directed substantially radially outwards.

15 Claims, 14 Drawing Sheets

(58) Field of Classification Search
USPC .......................................................... 83/870
See application file for complete search history.

(56) References Cited

U.S. PATENT DOCUMENTS

| | | | | |
|---|---|---|---|---|
| 4,744,123 | A * | 5/1988 | Le Testu | B23B 5/162 15/104.04 |
| 5,458,031 | A * | 10/1995 | Wolff | B26D 3/164 82/101 |
| 5,771,586 | A * | 6/1998 | Lotarski | C14B 1/16 30/294 |
| 6,129,304 | A * | 10/2000 | Biagiotti | B26D 3/161 242/530.1 |
| 2003/0084772 | A1* | 5/2003 | Shen | B23D 21/04 83/663 |
| 2005/0077008 | A1* | 4/2005 | Franceschi | B23B 31/16087 156/304.2 |
| 2021/0114243 | A1* | 4/2021 | Blasi | B26D 7/2621 |

FOREIGN PATENT DOCUMENTS

| | | | | |
|---|---|---|---|---|
| DE | 102005055114 | A1 | 5/2007 | |
| DE | 102009010776 | A1 * | 9/2010 | ............ B23B 5/162 |
| DE | 20 2009 010 958 | U1 | 2/2011 | |
| DE | 202010013750 | U1 | 1/2012 | |
| EP | 0 217 704 | A1 | 4/1987 | |
| EP | 1075910 | A1 * | 2/2001 | ............ B26D 3/164 |
| EP | 1 160 035 | A1 | 12/2001 | |
| EP | 1522359 | A1 | 4/2005 | |

* cited by examiner

TOOL HOLDER AND PIPE MACHINING TOOL

CROSS-REFERENCE TO RELATED APPLICATION

The present application claims the benefit of priority of German Patent Application No. 102020120792.1 filed on Aug. 6, 2020, the content of which is incorporated herein by reference in its entirety.

BACKGROUND

Technical Field

The present invention relates to a skiving apparatus for at least partial removal of the surface of an at least approximately tubular body and to a clamp assembly as a tool holder for a tool such as a skiving knife arrangement of a skiving apparatus, for machining an approximately tubular body.

In particular, the present invention relates to a skiving apparatus for at least partial removal of the surface of an at least approximately tubular body having a center axis, in particular of a plastic pipe, comprising a clamp assembly having a center axis and at least one clamp member for clamping the skiving apparatus to the tubular body, wherein, in the mounted state, the center axis of the clamp assembly coincides at least approximately with the center axis of the tubular body, and a skiving assembly comprising a skiving arm unit, a skiving knife arrangement disposed at a first end of the skiving arm unit and a skiving arm support which connects the clamp assembly to the skiving arm unit, wherein the skiving arm unit is connected by a second end to the skiving arm support in such a way that the skiving arm unit and the center axis of the clamp assembly are in a common plane, wherein the skiving knife arrangement has a skiving knife.

The present invention also relates to a clamp assembly as a tool holder for a tool, such as a skiving knife arrangement of a skiving apparatus, for machining an approximately tubular body having a center axis, in particular a plastic pipe. The clamp assembly has a center axis, a mandrel arranged coaxially with the center axis of the clamp assembly, and at least one clamping device, disposed on the mandrel and directed substantially radially outwards.

Description of the Related Art

Using plastic pipes to construct networks for supplying consumers with water or gases, for example, is known from practice. To create a network that has to span large distances and/or that has a large number of branches, the plastic pipes are joined at their ends to each other, or to other molded parts such as T-pieces or crosspieces, for example by electrofusion fittings and electrofusion welding. In order to ensure a tight weld, a slight amount is removed from the outer surfaces of the plastic pipes, before the actual welding, at those points where they are to be welded to a molded part or the like.

In this regard, it is necessary to take into account that plastic pipes, or their ends, are not always perfectly cylindrical, but can have ovalities. The surface of such plastic pipes can also have other irregularities such as scratches or scoring, or chemical changes such as oxidation or contamination, which may prevent a reliable and/or media-tight join between the tubular body and the molded part placed over it, or which may at least impair the quality of that connection. It is common practice, therefore, to machine by means of a skiving apparatus those sections of the tubular body onto which such a molded part is to be placed, so as to remove such irregularities or changes in the surface of the tubular body.

A skiving apparatus for scraping the outer surface of a plastic pipe and which is clamped by means of clamping arms in one end of the plastic pipe or tubular body to be machined, is known from EP 0 217 704. An arm carrying a scraper blade at its free end is oriented parallel to the surface of the tubular body in such a way that the scraper blade rests on the tubular body. The other end of the arm is connected to a drive spindle so that the arm can be rotatingly driven around the tubular body, with the scraper blade removing material from the surface of the tubular body.

Other skiving apparatuses, known from the prior art, for removing material from the surface of a plastic pipe are substantially C-shaped and have a scraper blade directed toward their inner side. Such a skiving apparatus is known from European patent application 1 160 035. In addition to the scraper blade, it has rollers on its inner side by means of which the skiving apparatus can roll along the surface of the tubular body to be machined, while the scraper blade removes material from the pipe surface.

The disadvantage of these prior art devices is that insufficient or no material is removed if the tubular body is not perfectly cylindrical, because due to the ovality of the tubular body the scraper blades lift off or do not contact with sufficient pressure to ensure removal of the desired amount of material. Furthermore, it is not always possible to position the machining tools with precision relative to the section of the tubular body to be machined, yet this is necessary for high-quality machining of the tubular body. There is a risk here, on the whole, that the area to be machined is smoothed insufficiently, or that an insufficient amount of material is removed, which can prevent a high-quality join between the tubular body and the molded part.

Embodiments of the present invention provide a skiving apparatus which overcomes the aforementioned disadvantages and allows a cylindrical body, such as a plastic pipe, to be machined in such a way that a high-quality join is produced between the tubular body and the molded part. Embodiments of the present invention also provide a tool holder, such as a clamp assembly, that allows a machining tool attached to the tool holder to be positioned precisely relative to the tubular body to be machined.

BRIEF SUMMARY

According to embodiments of the present invention, a skiving apparatus and a clamp assembly functioning as a tool holder for a tool are provided, such as a skiving knife arrangement of a skiving apparatus.

According to an embodiment of the invention, a skiving apparatus is proposed for at least partial removal of the surface of an at least approximately tubular body having a center axis, in particular of a plastic pipe, comprising a clamp assembly having a center axis and at least one clamp member for clamping the skiving apparatus to the tubular body, wherein, in the mounted state, the center axis of the clamp assembly coincides at least approximately with the center axis of the tubular body, and a skiving assembly comprising a skiving arm unit, a skiving knife arrangement disposed at a first end of the skiving arm unit and a skiving arm support with a first end and a second end, which connects the clamp assembly to the skiving arm unit, wherein the skiving arm unit is connected by a second end to the skiving arm support in such a way that the skiving arm unit and the center axis of the clamp assembly are in a common plane. The skiving knife arrangement has a skiving knife disposed at a first end of the skiving arm unit.

The skiving arm unit is connected by its first and second ends to the skiving knife arrangement and the skiving arm support and is pivotable in the common plane with the center axis of the clamp assembly in such a way that the knife carriage keeps its orientation relative to the center axis of the clamp assembly in every pivoted position of the skiving arm unit.

It is possible in this way to ensure that, at all times during machining, a skiving knife of a skiving knife arrangement keeps its orientation relative to the tubular body to be machined, as a result of which it is possible to ensure uniform removal of material and a high surface quality.

The skiving knife arrangement can be designed in different ways. In one advantageous configuration, the skiving knife arrangement has a knife carriage which is disposed at the end of the skiving arm unit and in which or on which a skiving knife is disposed. Such a knife carriage can ensure that the skiving knife is guided precisely.

The pivot axles can be realized in different ways. In one configuration, the pivot axles can be formed by pivot pins that are received in corresponding bores.

In one advantageous configuration, the skiving arm unit can have first and second skiving arm elements that are arranged parallel at least to each other and having first and second ends that are pivotably connected to the skiving knife arrangement and to the skiving arm support, with pivot axes oriented perpendicular to the common plane of the skiving arm unit and the center axis of the clamp assembly.

This configuration allows the skiving knife arrangement or the knife carriage to compensate for ovalities in the tubular body to be machined, and simultaneously to adapt to the reduced or decreasing diameter of the tubular body to be machined. The orientation of the skiving knife arrangement or knife carriage, and thus the orientation of the skiving knife relative to the axis of the tubular body is retained thereby.

It is also advantageous if the skiving arm elements are arranged one above the other in the radial direction relative to the center axis of the clamp assembly, thus ensuring that the movement of the knife carriage is exclusively in the common plane of the skiving arm unit and the center axis of the clamp assembly.

In one advantageous configuration of the skiving unit, the distances between the pivot axes are equally large in the radial direction relative to the center axis of the clamp assembly and in the axial direction relative to the center axis of the clamp assembly, so that the pivot axes in the common plane of the skiving arm unit and the center axis of the clamp assembly form the corner points of a parallelogram. In this way, the desired movement of the skiving knife arrangement relative to the tubular body is achieved.

In another advantageous configuration of the skiving arm unit, the distances between the pivot axes in the radial direction, relative to the center axis of the clamp assembly, are equally large, but are different in the axial direction, relative to the center axis of the clamp assembly. Depending on the respective configurations of the skiving assembly, a desired movement of the skiving knife arrangement relative to the tubular body can be achieved in this way.

At least one of the bores provided at one of the second ends of the skiving arm elements for receiving the pivot pins forming the pivot axes may also have a larger cross-section that differs from the cross-section of the pivot pin. This results in additional pivotability of the skiving knife arrangement, so as to further improve the orientation of the skiving knife relative to the tubular body to be machined.

The cross-section of the bore receiving the pivot pin may have the shape of an elongate hole, for example, or may be a bore with a larger diameter than the diameter of the pivot pin. However, the bore cross-section may also have any other shape, as long as additional pivotability of the skiving knife arrangement can be achieved.

The elongate hole may be designed in different ways to obtain a desired pivoting movement. In one preferred configuration, the elongate hole is designed in the shape of an arc or partial circle. Alternatively or additionally, it is also possible to choose a larger diameter for one of the bores than the diameter of the pivot pin received therein.

The tilt angle that can be achieved as a result of this additional tiltability of the skiving knife can be in a range between 0.5° and 20°, preferably in a range between 2.5° and 12.5°, further preferably in a range between 3° and 7°, particularly preferably approximately 5°.

A support member may also be advantageously disposed between the second ends of the skiving arm elements and the skiving knife arrangement. Such a support member allows the skiving knife arrangement to be oriented purposefully in relation to the skiving arm elements.

In one simple configuration, the skiving knife arrangement includes the skiving knife as well as the associated fixing elements and, where necessary, alignment elements disposed directly on the support member. If the skiving knife arrangement includes a knife carriage, this is attached to the support member.

With regard to the arrangement of the skiving arm elements, the second ends of the first and second skiving arm elements may be at least approximately C-shaped and may grip the support member at least partly. This configuration allows the pivot pins to be mounted in the region of the C-shaped ends, which in addition to the desired pivotability also allows the skiving arm elements to be guided in the pivot plane.

The first end of the first skiving arm element may also be at least approximately C-shaped in design and grip the skiving arm support at least partly to ensure, in this case also, that it is guided in the pivot plane of the skiving arm unit.

In one advantageous configuration, the first end of the second skiving arm element may also have a through hole into which the skiving arm support protrudes with its first end. This ensures that the second skiving arm element can be pivoted and guided in its pivot plane.

In an alternative configuration, the support member may be disposed laterally beside the second ends of the first and second skiving arm element.

It is also possible, with regard to the pivotable arrangement of the first and second skiving arm element on the skiving arm support, that the first ends of the first and second skiving arm element are received in a recess on the second end of the skiving arm support and are pivotably held therein by means of the pivot pins.

In one advantageous configuration, the skiving apparatus may include a force application unit that exercises a deflecting force on the skiving arm unit for reversibly biasing the skiving arm unit in a skiving position in a direction in the common plane of the skiving arm unit and the center axis of the clamp assembly.

Such biasing results in the knife carriage always being in contact with the surface of the pipe. The skiving knife is prevented from lifting off from the surface of the pipe, thus allowing the removal of material, for example to reduce or eliminate scratches or scoring in the surface of the pipe.

The skiving knife can be biased in different ways. According to the invention, the force application unit may have at least one elastic element, such as a spring, for producing the deflecting force. An elastic element is a technically simple way of producing a biasing force. Alternatively, it is possible to produce a biasing force by other means, such as by pneumatic or hydraulic piston/cylinder arrangements, for example.

According to embodiments of the invention, the force application unit may also have an adjustment mechanism for adjusting the strength of the deflecting force. By adjusting the strength of the deflecting force, it is possible to ensure that the knife carriage rests on the surface of the pipe even when the tubular body has larger ovalities.

The adjustment mechanism can be operated in different ways. In one advantageous configuration, the adjustment mechanism includes a clamping lever. Other actuating elements, such as adjusting screws or the like, can also be used, of course.

In order to produce the deflecting force, it may also be provided that the clamping lever has an eccentric cam and is pivotable about an axis of rotation in such a way that the elastic element is compressed, thus producing or reducing the deflecting force.

In one preferred configuration of the skiving apparatus, the adjustment mechanism has a pressure plate that can be reversibly displaced along the skiving arm support, the elastic element being disposed between the pressure plate and a section of the skiving arm unit. By moving the pressure plate relative to the section of the skiving arm unit, the elastic element therebetween can be put under stress in order to set a desired biasing force with which the knife carriage rests on the surface of the pipe.

The pressure plate can be moved along the skiving arm support directly and manually by the operator. This is preferably done when there is no load on the skiving arm unit. When no force is applied, the pressure plate can be adjusted and clamped in position. By subsequently orienting the skiving arm unit into the skiving position, the biasing force can be set or further increased to the desired amount.

Alternatively or additionally, a lever with an eccentric mechanism, such as the clamping lever with its eccentric cam, may be provided in order to put the elastic element under stress. The eccentric mechanism may be designed in such a way that, when it is pivoted about its axis of rotation, it acts on the pressure plate that can be reversibly displaced along the skiving arm support.

In another alternative configuration, the adjustment mechanism may include an adjusting screw mechanism for adjusting the strength of the deflecting force. This mechanism may contain a manually operated adjusting screw, by means of which operation of the adjustment mechanism is further simplified.

In another configuration, a stopper or stop that limits the deflection of the skiving arm unit may be provided instead of the adjustment mechanism designed as an adjusting screw mechanism. In such a variant, an elastic element may likewise be provided which is compressed into a state predetermined by the stop, thus resulting in a deflecting force with a fixed value. Such a stop can be realized in the form of a screw which is arranged in such a way that the skiving arm unit, or one element of it, comes into contact with the screw head. However, other elements such as a pin or bolt are also suitable as stops.

If the skiving knife disposed in the knife carriage is also biased in a direction perpendicular to the center axis of the clamp assembly, this can ensure uniform removal of material.

In the skiving apparatus, the knife carriage may also have at least two support rollers arranged at least approximately axially parallel to the center axis of the clamp assembly and which rest on the surface of the tubular body when the skiving apparatus is in the mounted state. The support rollers or wheels not only allow the knife carriage to be guided smoothly and evenly over the surface of the pipe, but also hold the knife carriage at a constant distance from the surface of the pipe.

In order to adapt the skiving apparatus to tubular bodies having different diameters or different wall thicknesses, the distance from the skiving arm unit to the center axis of the clamp assembly may also be adjustable.

The distance of the skiving arm unit from the center axis of the clamp assembly can be adjusted in different ways. A preferred configuration is one in which the skiving arm support is displaceable along the clamp assembly and at least approximately perpendicular to its center axis.

Alternatively, the skiving arm unit may be displaceable along the skiving arm support and be so designed that it can be fixed to it accordingly in the different positions.

In another configuration, the position of the skiving arm support along the center axis of the clamp assembly is adjustable. This allows the surface of the pipe to be machined in the axial direction to a desired length, without releasing the force that clamps the skiving apparatus to the tubular body.

The position of the skiving arm support along the center axis of the clamp assembly may be changed stepwise, for example after each revolution of the skiving arm unit around the tubular body, or continuously. An adjustment mechanism provided for this purpose may include, for example, a clamping device for clamping the skiving arm support at the center axis of the clamp assembly, or a spindle mechanism by means of which the skiving arm support, and thus the skiving assembly, is moved a certain distance along the center axis of the clamping device for each revolution around the tubular body.

In order to fix the skiving apparatus to the tubular body to be machined, it may be sufficient that the clamp assembly comprises only one clamp member. However, in order to fix the skiving apparatus at a precise position, preferably coaxially with the tubular body, the clamp assembly has more than one clamp member, preferably three clamp members, preferably in the form of clamp claws.

The clamp members are advantageously arranged at the same angular pitch to each other in order to support central mounting of the clamp assembly in the tubular body. If three clamp members are provided, they are arranged at an angle of 120° to each other.

To facilitate the attachment and removal of the skiving apparatus to and from the tubular body, a holding member is arranged, in the immediate vicinity of the center axis of the clamp assembly and between the adjacent clamp members. Such a holding member may be designed as a handle in the form of a metal rod, for example, or may take the form of a suitable webbing strap or webbing loop, wherein the holding member should be attached to the clamp assembly in such a way that the clamp assembly is not impaired in its function.

According to embodiments of the present invention, a clamp assembly is proposed as a tool holder for a tool, such as a skiving knife arrangement of a skiving apparatus, for machining an approximately tubular body having a center axis, in particular a plastic pipe. The tool holder or clamp assembly has a center axis, a mandrel arranged coaxially with the center axis of the clamp assembly, and at least one clamping device, disposed on the mandrel and directed substantially radially outwards. An operating mechanism for actuating the at least one clamping device is disposed on the mandrel for reversibly tensioning the clamp assembly in the tubular body coaxially with its center axis. This allows the tool holder or clamp assembly to be of compact design and easily operated.

The clamp assembly is suitable as a tool holder for different tools intended for machining a tubular body or the like, which are arranged in a specific orientation in relation to the tubular body. For that purpose, the clamp assembly can be arranged coaxially with the center axis of the tubular body to be machined, and preferably inside it. This is advantageous when the motion to be performed, for example by a skiving tool, a pipe cutter, a thread cutter or the like, is at least approximately circular in relation to the center axis of the tubular body.

The at least one clamping device advantageously includes at least one clamp claw comprising at least two claw members connected hingedly to each other and at least one clamp member disposed displaceably on the mandrel, to which one of the at least two claw members of the at least one clamp claw is hingedly connected, and which is reversibly displaceable on the mandrel for actuation of the clamping device by the operating mechanism.

The mandrel may be configured in different ways. It may be provided in the form of a solid shaft or as a hollow shaft. If the mandrel is designed as a hollow shaft, it is possible to guide a spindle, such as a threaded spindle, through this hollow shaft, to which spindle the machining tool can be attached and held rotatably about the center axis of the clamp assembly.

In an advantageous configuration, the operating mechanism includes a thread connection or thread engagement between the mandrel and the at least one clamp member, and an operating control. The mandrel may have an external thread that co-operates with an internal thread of the at least one clamp member.

In this configuration, the operating control may be embodied as a nut or lever, so that the operating mechanism can be operated in a simple manner, for example with a spanner wrench or by hand. A motor drive for this operating mechanism is also conceivable.

In an alternative configuration, the operating mechanism may include at least one piston/cylinder mechanism which is disposed coaxially on the mandrel and which co-operates with the at least one clamp member. This makes it even easier to operate the operating mechanism.

In order to realize such a piston/cylinder mechanism, an annular cylinder chamber in which an annular piston is arranged may be formed between the mandrel and a cylinder sleeve disposed coaxially on the mandrel.

In an advantageous configuration, the cylinder sleeve can be reversibly displaced on the mandrel by the operating mechanism. In this case, the at least one clamp member is connected to the cylinder sleeve and is reversibly displaced by the latter on the mandrel.

It is possible, of course, for the cylinder sleeve to be fixed to the mandrel, such that the annular piston can be displaced in the annular cylinder chamber. In this configuration, the annular piston is connected to the at least one clamp member in order to move it on the mandrel.

In order to activate the operating mechanism, the at least one piston/cylinder mechanism may also be connected to an external fluid source. Such a fluid source may be an hydraulic or pneumatic pump which pumps a respective fluid, such as hydraulic oil or air, into the piston/cylinder mechanism.

In another advantageous configuration of the clamp assembly, the clamp assembly may comprise a second clamp member which is displaceably disposed on the mandrel and which is hingedly connected to the second of the at least two claw members of the clamp claws, and a further piston/cylinder mechanism connected to the second clamp member.

This additional piston/cylinder mechanism preferably has the same structure as the first piston/cylinder mechanism and may be connected to the same fluid source. It is also possible to control the two piston/cylinder mechanisms separately, or to control the piston/cylinder mechanisms synchronously.

In an alternative configuration, the operating mechanism may have an integrated drive mechanism, thus resulting in a particularly compact structure and even easier operation of the clamp assembly.

The integrated drive mechanism may have a similarly integrated fluid reservoir for receiving a fluid, such as hydraulic oil. This makes the clamp assembly independent of any external fluid source or fluid supply.

The fluid reservoir can be realized in different ways. In the simplest case, it is an appropriate container that can be fixed to the mandrel, for example.

In one advantageous configuration, the clamp assembly may be provided with a further cylinder sleeve disposed coaxially on the cylinder sleeve, for forming an integrated fluid reservoir between the cylinder sleeve and the further cylinder sleeve.

The further cylinder sleeve for forming the fluid reservoir may be provided as a separate element. In a preferred configuration of the clamp assembly according to the invention, the clamp assembly has a connection member which is disposed coaxially on the mandrel and which also includes the further cylinder sleeve, in addition to other elements. This results in a high level of integration, as well as reliable operation of the clamp assembly according to the invention.

In one advantageous configuration, the clamp assembly may include an integrated pump mechanism for transferring the fluid from the fluid reservoir into the cylinder chamber of the piston/cylinder mechanism, a pump cylinder integrated in the further cylinder sleeve, and a pump piston guided therein.

The integrated pump mechanism may be driven in different ways, for example by an electric drive means. In one preferred configuration, the integrated pump mechanism includes a lever for manually operating the pump mechanism.

Other advantageous configurations and embodiments of the invention shall now be described with reference to the description of embodiments and to the attached drawings. The terms "top," "bottom," "left" and "right" used, where relevant, to describe the embodiments relate to the drawings oriented in such a way that the reference signs and names of the Figures can be read normally.

BRIEF DESCRIPTION OF THE SEVERAL
VIEWS OF THE DRAWINGS

DETAILED DESCRIPTION

Figure 1:
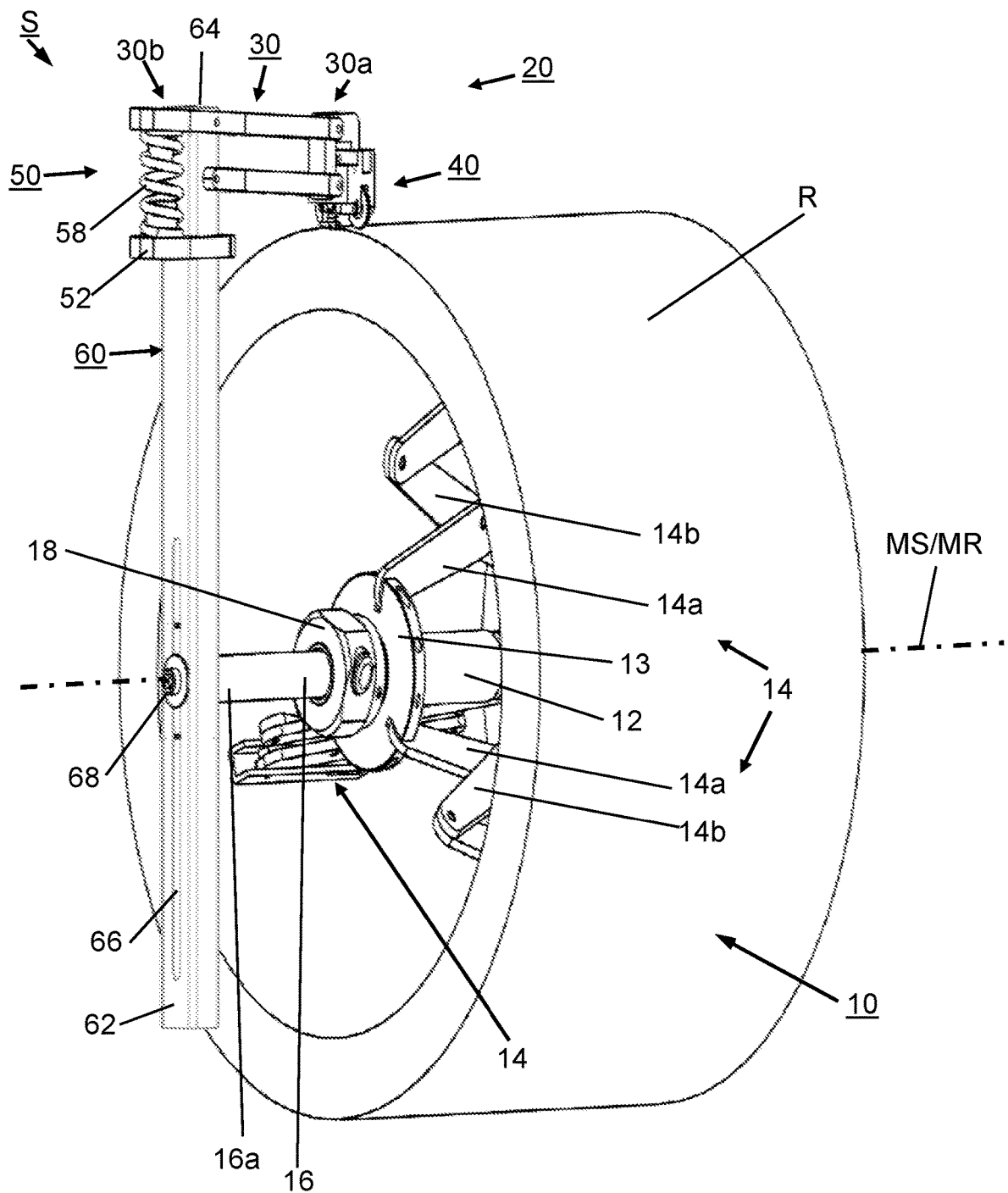
FIG. 1 shows a schematic perspective view of a first embodiment of a skiving apparatus according to the present invention.

FIG. 1 shows a schematic perspective view of a first embodiment of a skiving apparatus S according to the present invention.

In the configuration according to FIG. 1, skiving apparatus S comprises a clamp assembly 10 having a center axis MS, and a skiving assembly 20 comprising a skiving arm unit 30, a skiving knife arrangement 40, a force application unit 50, and a skiving arm support 60. In FIG. 1, skiving apparatus S is mounted on a tubular body R, the surface material of which is to be skived or removed, in sections at least, from the front end that can be seen in FIG. 1.

The clamp assembly 10 used to fix skiving assembly 20 to tubular body R includes a mandrel in the form of a hollow shaft or support sleeve 12, a shaft in the form of a threaded spindle 16 that is horizontally oriented in FIG. 1, on which support sleeve 12 is arranged and which extends coaxially with the center axis MS of clamp assembly 10. Three clamping devices directed radially outwards, in relation to the center axis MS of clamp assembly 10, are disposed in the form of clamp claws 14 on the mandrel or support sleeve 12 at a uniform angular pitch, viewed in the circumferential direction of threaded spindle 16, with an angle of 120° between two adjacent clamp claws 14. At its left-hand end as shown in FIG. 1, support sleeve 12 has a first flange 13 extending radially outwards from support sleeve 12. Clamp claws 14 each comprise two claw members 14a, 14b hingedly connected to each other, wherein claw members 14a are hingedly connected by their one end to support sleeve 12 via the first flange 13, and claw members 14b are hingedly connected to a second flange 13 (cf. FIG. 6) or similar element by their respective ends. This second flange 13 is preferably arranged at least axially displaceably on support sleeve 12. By moving the second flange 13 relative to the first flange 13 on support sleeve 12, clamp claws 14 are made longer or shorter, as will be described with reference to FIG. 6. In this way, the clamp assembly 10 inserted into tubular body R can be clamped inside it, or released and removed from it, in a manner that is known per se. The center axis of support sleeve 12 is aligned coaxially with the center axis MR of tubular body or pipe R.

A support or holding strap, not shown in FIG. 1, which is fitted between the two flanges 13, can make it easier to handle clamp assembly 10 when clamping it into tubular body R. It allows precise positioning of clamp assembly 10 inside tubular body R and reduces the risk of crushing during clamping and releasing.

In the embodiment of clamp assembly 10 shown, the first flange 13 is axially fixed, but is held rotatable about the center axis MS of clamp assembly 10 on support sleeve 12. A clamp member in the form of a nut 18 attached to the left-hand end of support sleeve 12 in FIG. 1 is fixedly connected to support sleeve 12. The second flange 13, not visible in FIG. 1, is mounted axially displaceably on the right-hand end of support sleeve 12. For that purpose, support sleeve 12 has an external thread 12a in the region of its right-hand end, onto which the second flange 13 can be screwed by means of a corresponding internal thread. When nut 18 is turned, support sleeve 12 also turns about its center axis and the center axis MS of clamp assembly 10. This causes the second flange 13 to move reversibly in the axial direction along support sleeve 12 towards the first flange 13, thus bracing clamp claws 14 against the inner wall of the pipe or releasing them from it (cf. FIG. 6).

Skiving arm support 60 is attached to the left-hand end 16a, in FIG. 1, of threaded spindle 16. Skiving arm support 60 is substantially rod-shaped and has an approximately square cross-sectional profile in the embodiments shown. An elongate hole 66 provided on the side of skiving arm support 60 facing away from threaded spindle 16 in the assembled state extends from a region at the bottom first end 62, in FIG. 1, of skiving arm support 60 in the direction of the second end 64 approximately as far as its middle, and through skiving arm support 60 perpendicularly to its longitudinal extension. Skiving arm support 60 is releasably fixed to the left-hand end 16a of threaded spindle 16 by means of a fixing element 68, for example a fastener, inserted through elongate hole 66. Skiving arm support 60 is oriented perpendicular to the threaded spindle 16, i.e., it is vertically oriented in FIG. 1.

If skiving arm support 60 is formed by a hollow profile, a fixing element such as a cage nut, a sliding block or the like may be located inside it, by means of which skiving arm support 60 can be fastened to threaded spindle 16. In such a case, threaded spindle 16 may extend through elongate hole 66.

Figure 2:
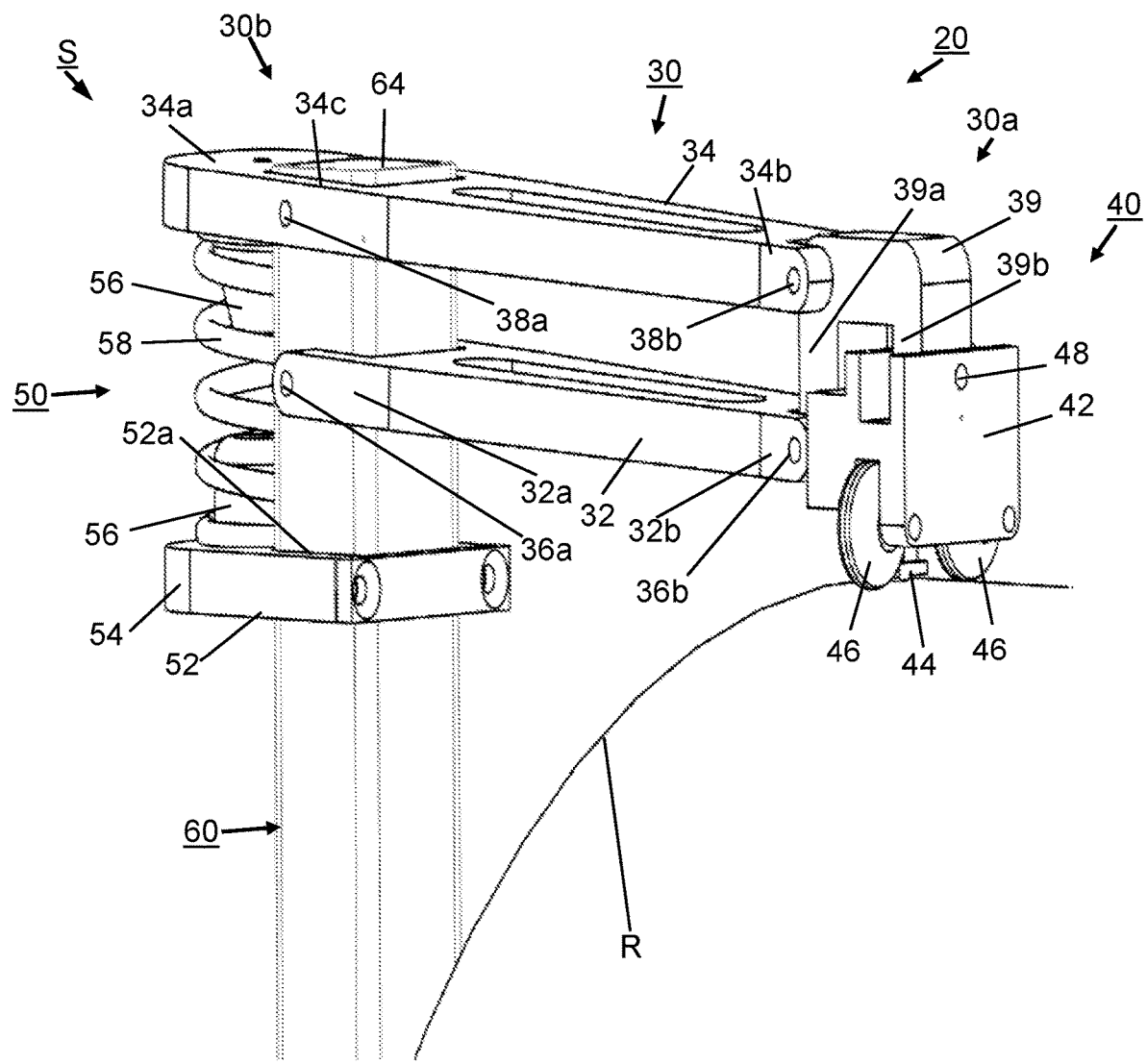
FIG. 2 shows an enlarged perspective view of a skiving assembly of the skiving apparatus according to FIG. 1.

Skiving assembly 20, an enlarged perspective view of which is shown in FIG. 2, is mounted at the upper, second end 64 of skiving arm support 60.

Skiving assembly 20 comprises skiving arm unit 30, skiving knife arrangement 40 and force application unit 50.

Skiving arm unit 30 has first and second skiving arm elements 32, 34 oriented parallel to and spaced apart from each other and oriented horizontally in FIG. 1, each having first and ends 32a, 34a; 32b, 34b. Skiving arm elements 32, 34 lie in the common plane of skiving arm unit 30 and the center axis MS of clamp assembly 10, i.e., they are arranged one above the other in the radial direction relative to the center axis MS of clamp assembly 10.

The first ends 32a, 34a of skiving arm elements 32,34 are hingedly attached via pivot pins 36a, 38a to skiving arm support 60 in the region of its second end 64. Pivot pins 36a, 38a are oriented transverse to the longitudinal extension of skiving arm support 60 and perpendicular to the center axis MS of clamp assembly 10.

In the embodiments shown, skiving arm elements 32, 34 have a substantially rectangular cross-section, with recesses that extend in a region between their first and second ends 32a, 34a; 32b, 34b and that reduce the weight of skiving arm elements 32, 34. Skiving arm elements 32, 34 may also have any other suitable cross-section, of course, such as a round, oval or triangular cross-section.

The second ends 32b, 34b of skiving arm elements 32,34 are hingedly attached via pivot pins 36b, 38b to a first limb 39a of a substantially C-shaped support member 39. The C-shaped support member 39 is oriented in such a way that the letter "C" formed by it is upside down with free limbs 39a, 39b pointing downward in FIG. 2. Pivot pins 36b, 38b are also oriented transverse to the longitudinal extension of skiving arm support 60 and perpendicular to the center axis MS of clamp assembly 10.

The respective radial distance, in relation to the center axis MS of clamp assembly 10, between pivot pins 36a, 38a and between pivot pins 36b, 38b, i.e., the vertical distance between them as shown in FIGS. 1 to 5, is identical. The distances between the pivot pins 36a, 36b of skiving arm element 32 and between the pivot pins 38a, 38b of skiving arm element 34 in the axial direction, in relation to the center axis MS of clamp assembly 10, i.e., the distances in the horizontal direction as shown in FIGS. 1 to 5, are also equally large, so the sections of the skiving arm elements 32, 34 between pivot pins 36a, 36b; 38a, 38b form a parallelogram with the respective sections of the skiving arm support 60 and the limb 39a of support member 39 facing them, with pivot pins 36a, 36b; 38a, 38b located at the corner points of the parallelogram. As a result, the orientation of the skiving knife arrangement 40 to the skiving arm support 60, and hence also the orientation of the skiving knife arrangement 40 to the tubular body R, is the same in every pivoted position of the skiving arm unit 30 in the circumferential direction of tubular body R.

As can also be seen in FIG. 2, the pairs of pivot pins 36a, 38a; 36b, 38b are each arranged on a line which is radially oriented in relation to the center axis MS of clamp assembly 10, which according to FIG. 2 is oriented perpendicular to the horizontally extending center axis MS of clamp assembly 10. Deviation from this perpendicular orientation is possible, however, within limits at least.

Skiving knife arrangement 40 is mounted on the second limb 39b of the substantially C-shaped support member 39.

Skiving knife arrangement 40 has a substantially cuboidal knife carriage 42, in which a skiving knife 44 is disposed in such a way that it protrudes out of knife carriage 42 on the side of the latter facing the center axis MS of clamp assembly 10. Knife carriage 42 also has two support rollers or wheels 46 arranged one behind the other in relation to the circumferential direction of the tubular body R, the axes of which are oriented parallel to each other and, in a state in which they are mounted on a tubular body R, parallel to the center axis MS of clamp assembly 10. Support rollers 46 protrude from knife carriage 42 on the side facing the center axis MS of clamp assembly 10.

In a state in which they are mounted on a tubular body R, support rollers 46 rest on the surface of tubular body R so that knife carriage 42 can roll on tubular body R. Skiving knife 44, which protrudes from knife carriage 42 in the direction of tubular body R, is biased in the direction of center axis MR of tubular body R by a spring element, not shown, so that it rests on tubular body R under this biasing force and can penetrate the material on the outer circumferential area of tubular body R.

Knife carriage 42 is connected to the second limb 39b of support member 39 via a pivot pin 48, and can be pivoted about the latter relative to support member 39. Pivot pin 48 is oriented parallel to the center axis MS of clamp assembly 10. This allows knife carriage 42 to follow and compensate for any surface imperfections on the surface of tubular body R, such as flattened areas, for example, without lifting off from them.

As can be seen in FIG. 2, in particular, the first end 32a of the first skiving arm element 32, facing skiving arm support 60, is C-shaped and therefore grips partly around skiving arm support 60. In contrast thereto, the first end 34a of the second skiving arm element 34 has a through hole 34c whose cross-section is at least approximately the same as the cross-section of the skiving arm support 60 that extends through or engages with this through hole 34c, but which can also fill and pass through it completely.

The first skiving arm element 32 ends with its first end 32a at skiving arm support 60, whereas the second skiving arm element 34 projects with its first end 34a to the left in FIG. 2 beyond skiving arm support 60.

Below skiving assembly 20, a pressure plate 52 is disposed that is oriented at least approximately horizontal in the view shown in FIGS. 1 and 2. Pressure plate 52 has a through hole 52a whose cross-section is substantially the same as the cross-section of skiving arm support 60 that extends at least approximately perpendicularly through this through hole 52a. Through hole 52a is slightly larger than the cross-section of skiving arm support 60, so that pressure plate 52 can be moved along skiving arm support 60. Through hole 52a is disposed in the section of pressure plate 52 facing skiving knife arrangement 40, such that pressure plate 52 extends substantially as far as the opposite side of skiving arm support 60 from skiving knife arrangement 40, where it forms a pressure plate section 54.

An elastic element 58 forming a force application element, for example a pressure spring as shown in the embodiments, is disposed between the first end 34a of skiving arm element 34 and pressure plate section 54 of pressure plate 52.

Substantially cylindrical guide/securing members 56 which secure elastic element 54 in its position are mounted on the facing surfaces of the first end 34a of skiving arm element 34 and of the pressure plate section 54 of pressure plate 52.

The through hole 52a in pressure plate 52 is designed in such a way that pressure plate 52 jams in a desired position on skiving arm support 60, under the influence of a force applied by elastic element 54, and is secured in that position against further displacement. Pressure plate 52 may be provided additionally with at least one securing member in order to fix it in the desired position and secure it against inadvertent displacement, e.g., when potential changes in load occur. Fasteners, for example, may be provided as securing members in pressure plate 52, by means of which the latter can be braced in the desired position on skiving arm support 60. It is also conceivable that a clamping member be attached to skiving arm support 60 directly underneath pressure plate 52 when the latter is in the desired position.

Pressure plate 52, in combination with pressure plate section 54, guide/securing members 56 and elastic element 54, forms the force application unit or biasing means 50. This generates a deflecting or biasing force that acts on skiving arm unit 30 and causes the skiving knife arrangement 40 to rest on tubular body R with its support rollers 46.

Figure 3:
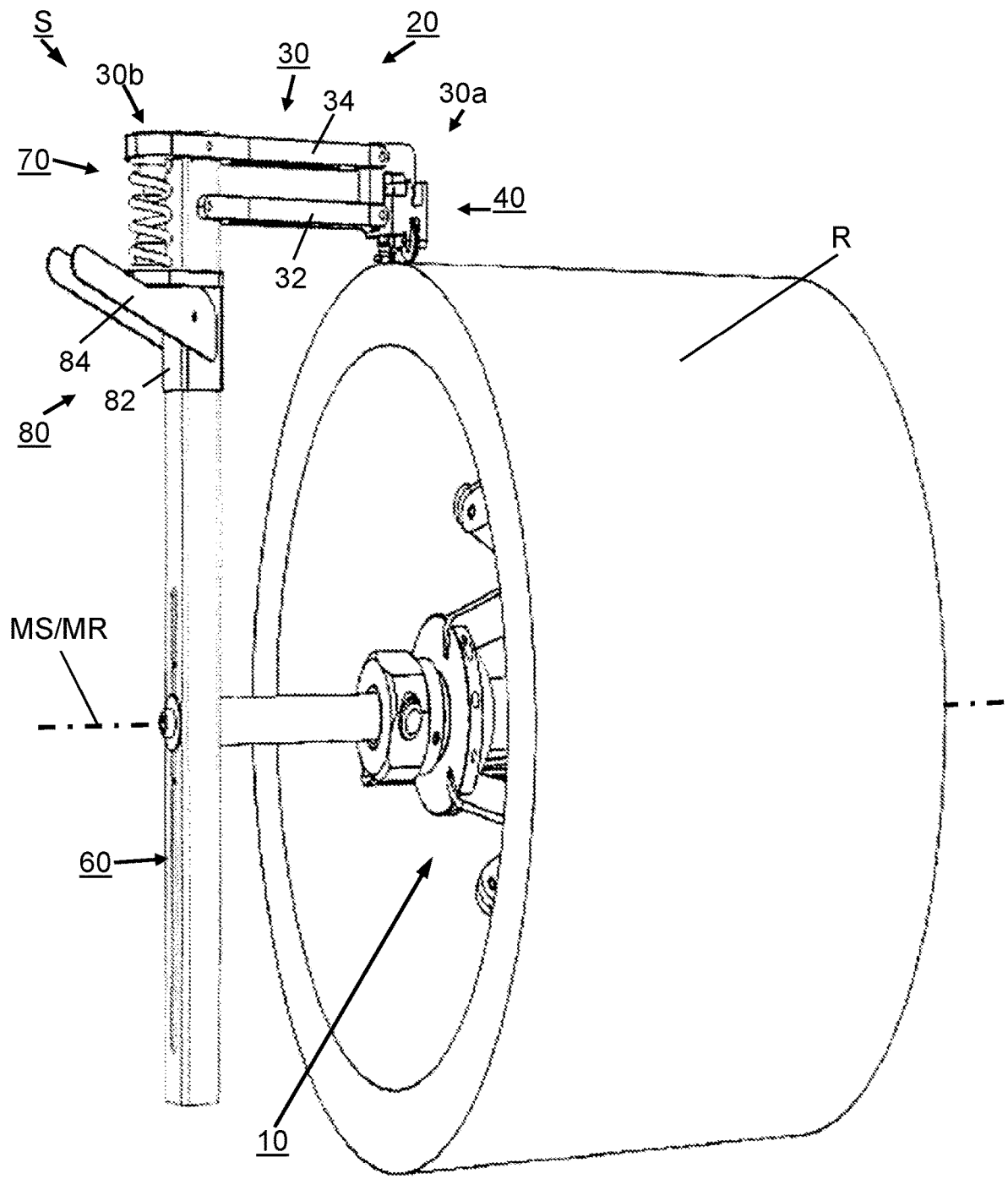
FIG. 3 shows a schematic perspective view of a second embodiment of a skiving apparatus according to the present invention, with a skiving assembly in the unbiased state.
Figure 4:
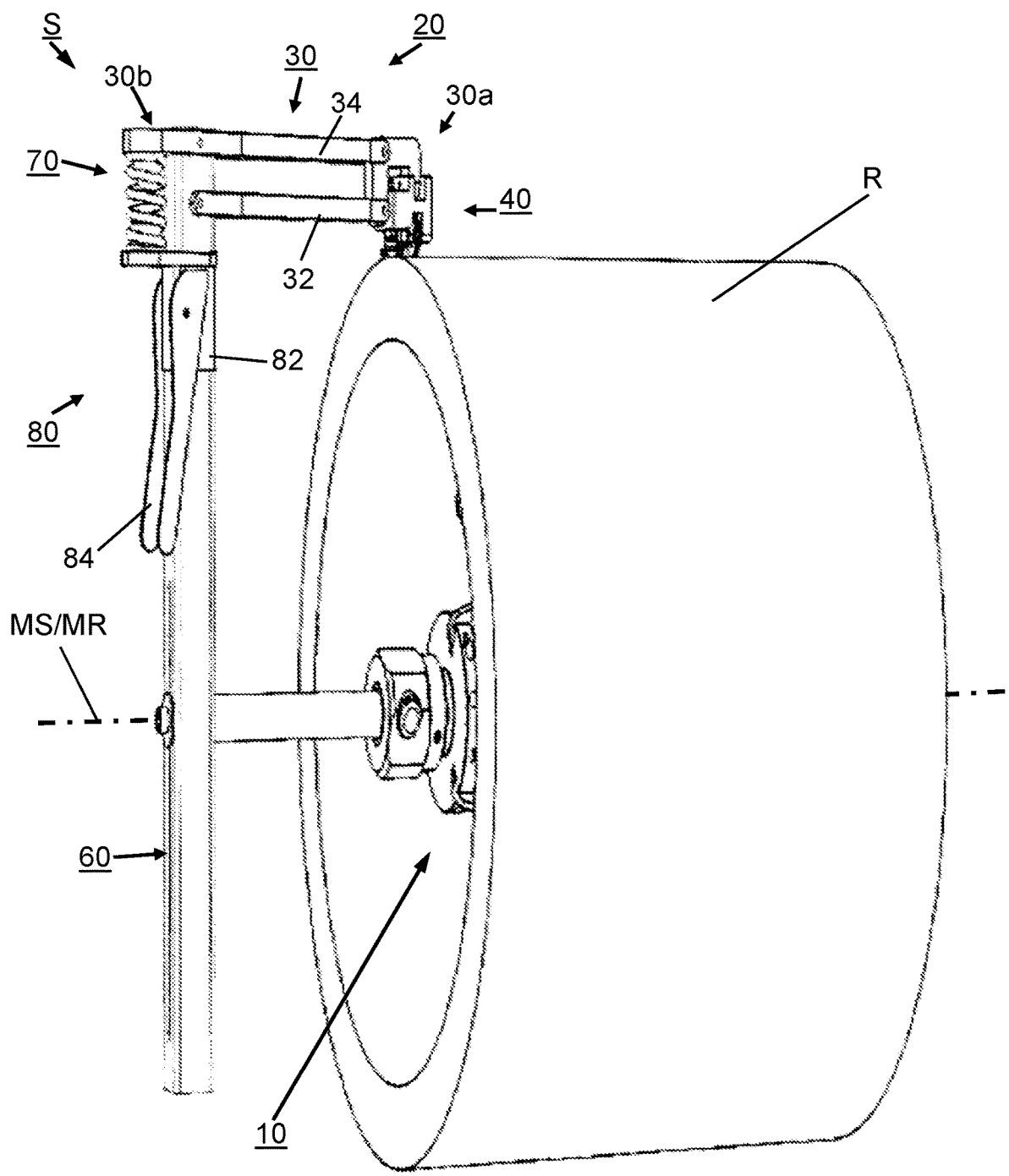
FIG. 4 shows a schematic perspective view of the skiving apparatus according to FIG. 3, with the skiving assembly in the biased state.
Figure 5:
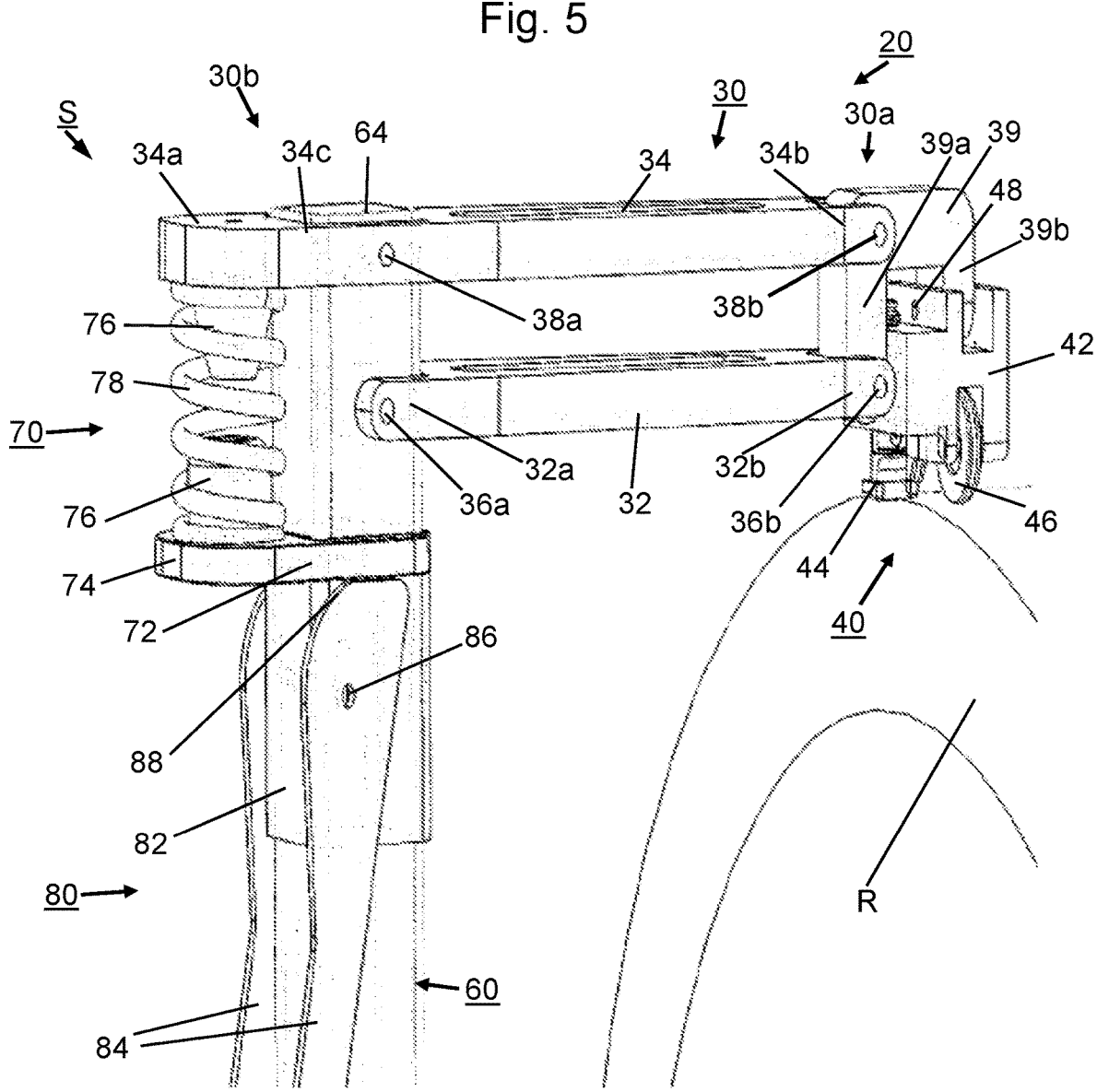
FIG. 5 shows an enlarged perspective view of the skiving assembly of the skiving apparatus according to FIG. 4.

The second embodiment of the skiving apparatus S according to the invention, as shown in FIGS. 3 to 5, likewise comprises a clamp assembly 10 and a skiving assembly 20 comprising a skiving arm unit 30, a skiving knife arrangement 40 and a skiving arm support 60, which are identical in structure and design to the respective assemblies of skiving apparatus S according to FIGS. 1 and 2. The second embodiment shown in FIGS. 3 to 5 differs from the first embodiment according to FIGS. 1 and 2 in the structure of force application unit 70.

In addition to a pressure plate 72 which has the same structure as pressure plate 52 and which has a corresponding pressure plate section 74, force application unit 70 of the skiving apparatus S according to FIGS. 3 to 5 also includes an elastic element 78 that is disposed between pressure plate section 74 and the first end 34*a* of skiving arm element 34 and which is secured in its position by respective guide/securing members 76.

The force application unit 70 according to the second embodiment of skiving apparatus S, shown in an enlarged view in FIG. 5, also has a clamping lever arrangement 80. Clamping lever arrangement 80 comprises a tubular sleeve 82 whose cross-section is substantially the same as the cross-section of skiving arm support 60, but slightly larger by comparison, and which is displaceably arranged on skiving arm support 60. Sleeve 82 may be releasably connected, e.g., by means of suitable lock screws or some other suitable clamping device, to skiving arm support 60, in order to secure it in its position on skiving arm support 60.

A clamping lever 84 having a first end 84*a* and a second end 84*b* is attached pivotably about a pivot axle 86 in the region of the second end 84*b* to sleeve 82. Pivot axle 86 extends substantially perpendicularly to the longitudinal extension of skiving arm support 60 and transversely to the center axis MS of clamp assembly 10.

Pivot axle 86 may extend through skiving arm support 60 and sleeve 82 in order to fix sleeve 82 on skiving arm support 60.

In the region of its second end 84*b*, clamping lever 84 has an eccentric cam 88. This is designed in such a way that the distance between pivot axle 86 and the longitudinal side edge of clamping lever 84 is smaller on the longitudinal side of clamping lever 84 than the distance between pivot axle 86 and the front end of clamping lever 84. This results in pressure plate 72 being pushed, in the biased state of skiving assembly 20 as shown in FIG. 4, in contrast to the unbiased state that can be seen in FIG. 3, in the direction of the second end 64 of skiving arm support 60, with the result that elastic element 78 is compressed.

Eccentric cam 88 can also be designed in such a way that clamping lever 84 is secured, in the biased state of skiving assembly 20, against inadvertent actuation in that biased position. A suitably designed end face of clamping lever 84 can be provided for this purpose in the region of eccentric cam 88, which end face can have a flattened portion or latching element that co-operates with the corresponding surface of pressure plate 72.

In the embodiment shown in FIGS. 3 to 5, clamping lever 84 is formed by two identical sub-levers arranged on two opposite sides of sleeve 82. It is possible, of course, to connect the sub-levers to each other not only via pivot axle 86, but also and additionally at their free ends, so that, for example, their sections facing away from pivot axle 86 form a common U-shaped section that grips around skiving arm support 60 when skiving assembly 20 is in the biased state as shown in FIG. 4.

Figure 6:
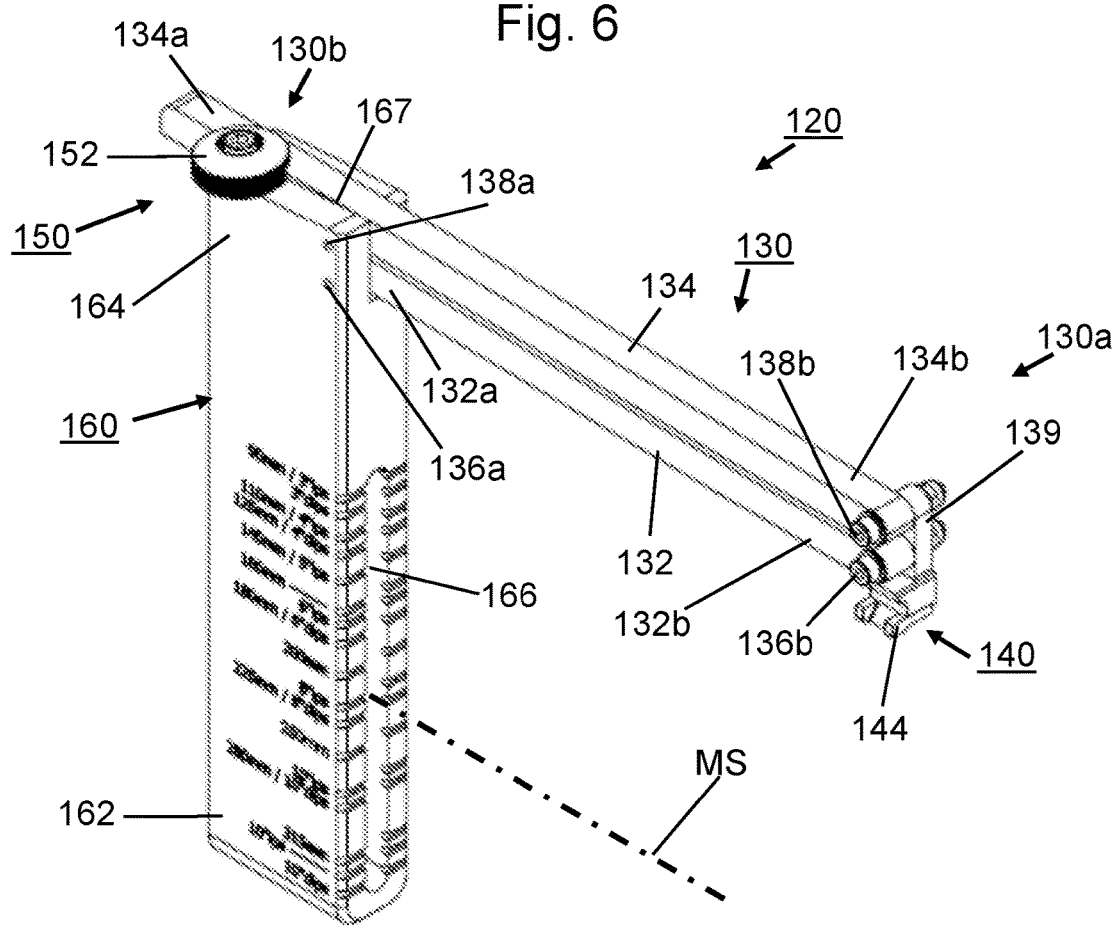
FIG. 6 shows a schematic perspective view of a third embodiment of a skiving apparatus according to the present invention.

FIG. 6 shows a schematic perspective view of a third embodiment of a skiving apparatus according to the present invention, but without an associated clamp assembly like clamp assembly 10, for example. To aid understanding, only the center axis MS of the associated clamp assembly is shown in this view.

As can be seen from FIG. 6, this skiving apparatus comprises a skiving assembly 120 and a force application unit 150, which are disposed on the upper, second end 164 of skiving arm support 160.

Skiving arm support 160 has a substantially cuboidal shape and comprises an elongate hole 166 extending at least approximately parallel to the longitudinal extension of skiving arm support 160 and extending from its first end 162 in the direction of its second end 164 and through skiving arm support 160 perpendicularly to its longitudinal extension. Skiving arm support 160 can be attached to a clamp assembly, like clamp assembly 10, by means of elongate hole 166, as described with reference to the first and second embodiment of skiving apparatus S. As can also be seen in FIG. 6, skiving arm support 160 is provided with markings arranged along elongate hole 166 and which indicate and permit the attachment position of the skiving arm support 160 on the clamp assembly in relation to the diameter of a tubular body R to be machined. At its second end 164, a U-shaped recess 167 extending at least approximately perpendicular to the longitudinal axis of skiving arm support 160 over the entire width of support 160 extends from the front end of skiving arm support 166 in the direction of the first end 162. The depth of recess 167 is approximately equal to the height of skiving arm unit 130, and the width of recess 167 is approximately the same as the width of skiving arm unit 130.

Skiving assembly 120 comprises skiving arm unit 130 and skiving knife arrangement 140. Skiving arm unit 130 has first and second skiving arm elements 134, 132 parallel to and spaced apart from each other and each having first and second ends 132*a*, 134*a*; 132*b*, 134*b*. Skiving arm elements 132, 134, which have a square cross-section, lie in the common plane of skiving arm unit 130 and the center axis MS of the clamp assembly, i.e., they are arranged one above the other in the radial direction relative to the center axis MS of the clamp assembly.

The first ends 132*a*, 134*a* of skiving arm elements 132, 134 are received in recess 176 in skiving arm support 160 and are held hingedly therein via pivot pins 136*a*, 138*a*. Pivot pins 136*a*, 138*a* are oriented transverse to the longitudinal extension of skiving arm support 160 and perpendicular to the center axis MS of the clamp assembly. The first end 134*a* of the first skiving arm element 134 protrudes beyond the first end 132a of second skiving arm element 132 and protrudes from recess 167.

Figure 7:
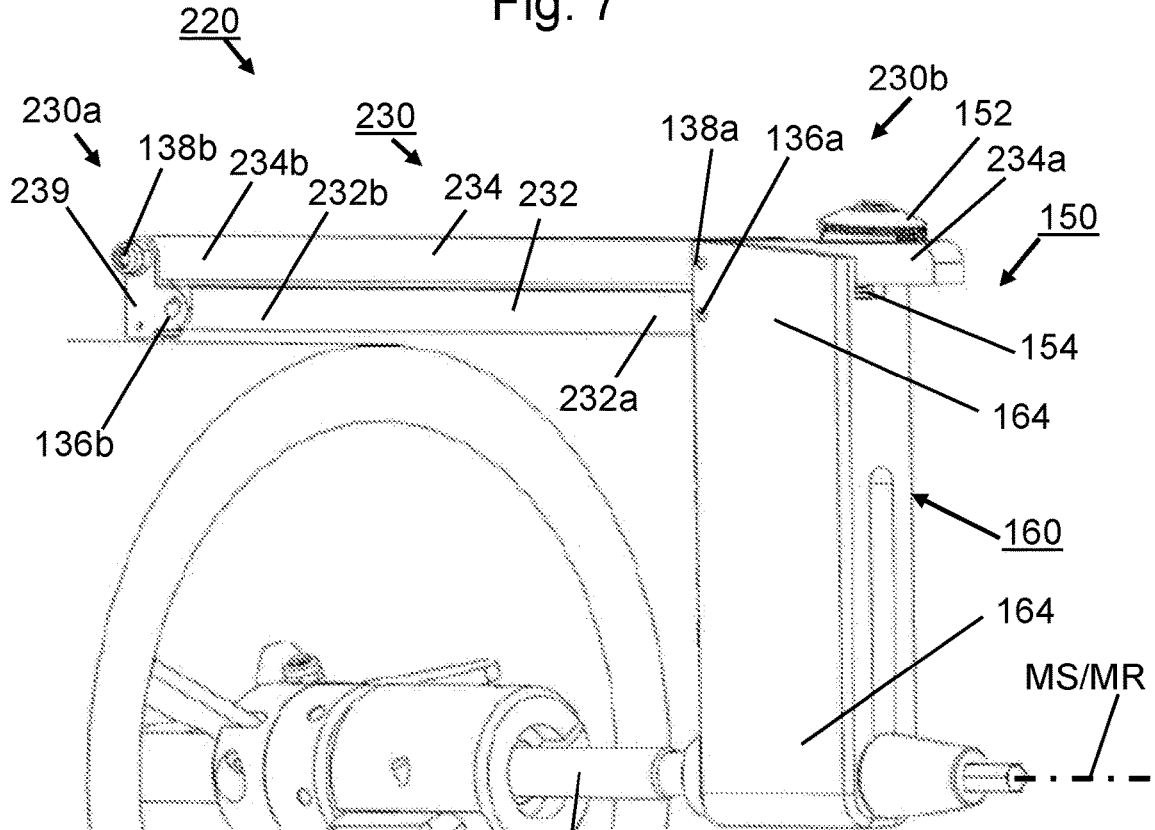
FIG. 7 shows a schematic perspective view of a fourth embodiment of a skiving apparatus according to the present invention.

A force application unit or biasing unit 150 is disposed at the second end 164 of skiving arm support 160. This unit comprises an adjustment mechanism for adjusting the strength of the deflecting force, in the form of an adjusting screw 152 that is screwed into a matching thread in the front surface of the second end 164 of skiving arm support 160. The screw head of adjusting screw 152 covers at least partially the first end 134a of the first skiving arm element 134. The force application unit or biasing unit 150 further comprises an elastic element, in the form of a spring 154, which is disposed in recess 167 and acts upon the first end 134a of the first skiving arm element 134, as can be seen in FIG. 7.

The second ends 132b, 134b of skiving arm elements 132,134 are hingedly attached via pivot pins 136b, 138b to a support member 139 which is substantially cuboidal in shape and is disposed laterally beside the second ends 132b, 134b of skiving arm elements 132,134. The bottom end, in FIG. 6, of support member 139 protrudes beyond the second skiving arm element 132 in the direction of the center axis MS of the clamp assembly. Skiving knife arrangement 140 is attached to the bottom end of support member 139. In this configuration, skiving knife arrangement 140 comprises a skiving knife 144 which is fixed to the bottom end of support member 139 by means of a fixing element, for example a fastener, which is not shown in further detail.

Figure 6A:
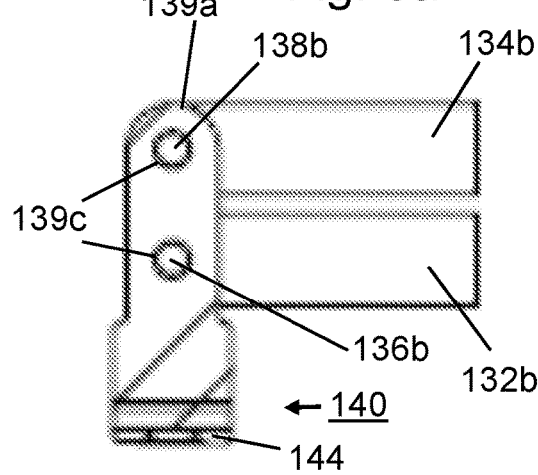
FIG. 6a shows an enlarged view of a first configuration of a support member of the skiving apparatus according to FIG. 6.

FIG. 6a shows an enlarged view of a first configuration of a support member 139a of the skiving apparatus according to FIG. 6. Support member 139a has two bores 139c whose inner diameters correspond to the outer diameter of pivot pins 136b, 138b and into which pivot pins 136b, 138b extend. Pivot pins 136a, 138a,136b, 138b thus form a parallelogram by which the orientation of support member 139a and hence the orientation of skiving knife arrangement 140 is kept when skiving arm unit 130 is pivoted about the pivot axes formed by pivot pins 136a, 138a,136b, 138b.

Figure 6B:
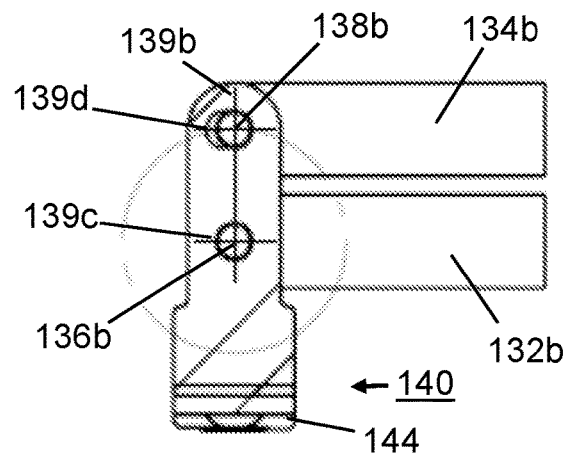
FIG. 6b shows an enlarged view of a second configuration of a support member of the skiving apparatus according to FIG. 6.

FIG. 6b shows an enlarged view of a second configuration of a support member 139b of the skiving apparatus according to FIG. 6. Support members 139a, 139b are identical in structure and differ only in the design of the respective upper hole. Support member 139b has an upper bore 139d in the form of an elongate, partly circular hole, with an arc that extends concentrically with bore 139c, as illustrated by the circle drawn by broken lines in FIG. 6b. The radius of the arc corresponds to the distance between the centers of bores 139c, 139d. This design of bore 139d allows additional pivoting of support member 139b, and thus of skiving knife 144 about pin 136b. This additional pivotability of skiving knife 144 allows further adjustment of the skiving apparatus to the tubular body R to be machined, for example in the case where the end of tubular body R is conical in shape.

FIG. 7 shows a perspective view of a fourth embodiment of a skiving apparatus according to the invention. This comprises a clamp assembly 10 to which skiving arm support 160 is fixed via spindle 16, by its lower, first end 162. A skiving assembly 220 having a skiving arm unit 230 that is substantially identical in structure to skiving arm unit 130 is disposed at the upper, second end 164 of skiving arm support 160.

Skiving arm unit 230 differs from skiving arm unit 130 in the design of support member 239, which is substantially L-shaped in design and in which the bores receiving pivot pins 136b,138b are arranged at the end of the L.

Figure 7A:
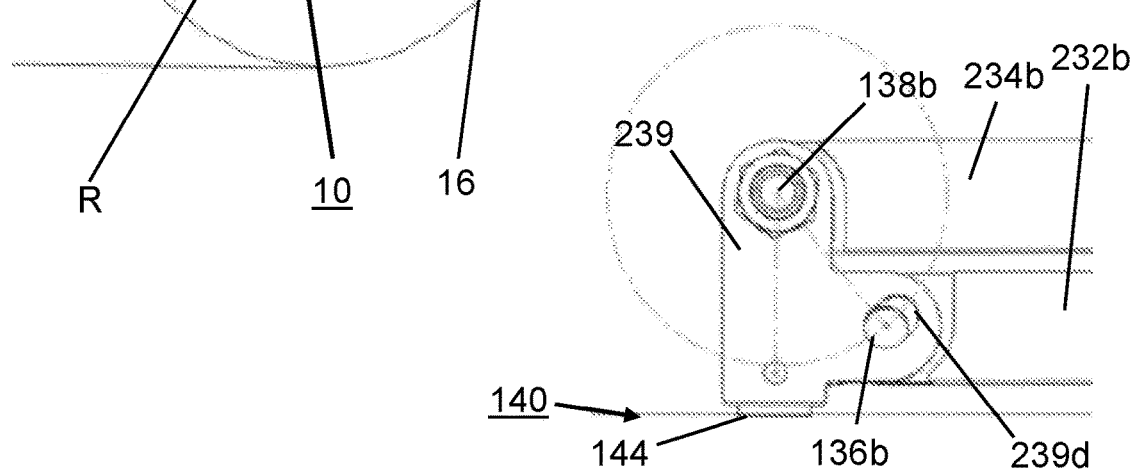
FIG. 7a shows an enlarged view of the support member of the skiving apparatus according to FIG. 7.

As can be seen in the enlarged view of support member 239 in FIG. 7a, the second end 232b of skiving arm element 232 is shorter than the second end 234b of skiving arm element 234, such that one limb of support member 239 has a substantially perpendicular orientation, whereas the other limb is oriented approximately horizontal to skiving arm element 232.

In this configuration, the distance between pivot pins 138a, 138b is greater than the distance between pivot pins 136a, 136b. This changes the orientation of support member 239, and hence also the orientation of skiving knife 144 in relation to the tubular body R to be machined, when skiving arm unit 230 is pivoted.

As can also be seen in FIG. 7a, bore 239d at the end of the horizontally oriented limb is designed as a partly circular elongate hole, with an arc that extends concentrically with the bore, not visible in FIG. 7a, in support member 239, and the radius of which corresponds to the distance between the centers of these bores, as illustrated by the circle drawn by broken lines in FIG. 7a. Depending on the selected length of the partly circular elongate hole 139d, the orientation of skiving knife 144 in relation to the tubular body R to be machined can thus be corrected or adjusted in such a way that it is possible to machine a tubular body R that has a conical end.

As described above with reference to support member 139, a skiving knife arrangement 140 with a skiving knife 144 is disposed on support member 239 also. Skiving knife 144 is fixed by means of a fixing element, not shown in further detail, to the side of support member 239 facing downward in FIG. 7a.

Figure 8:
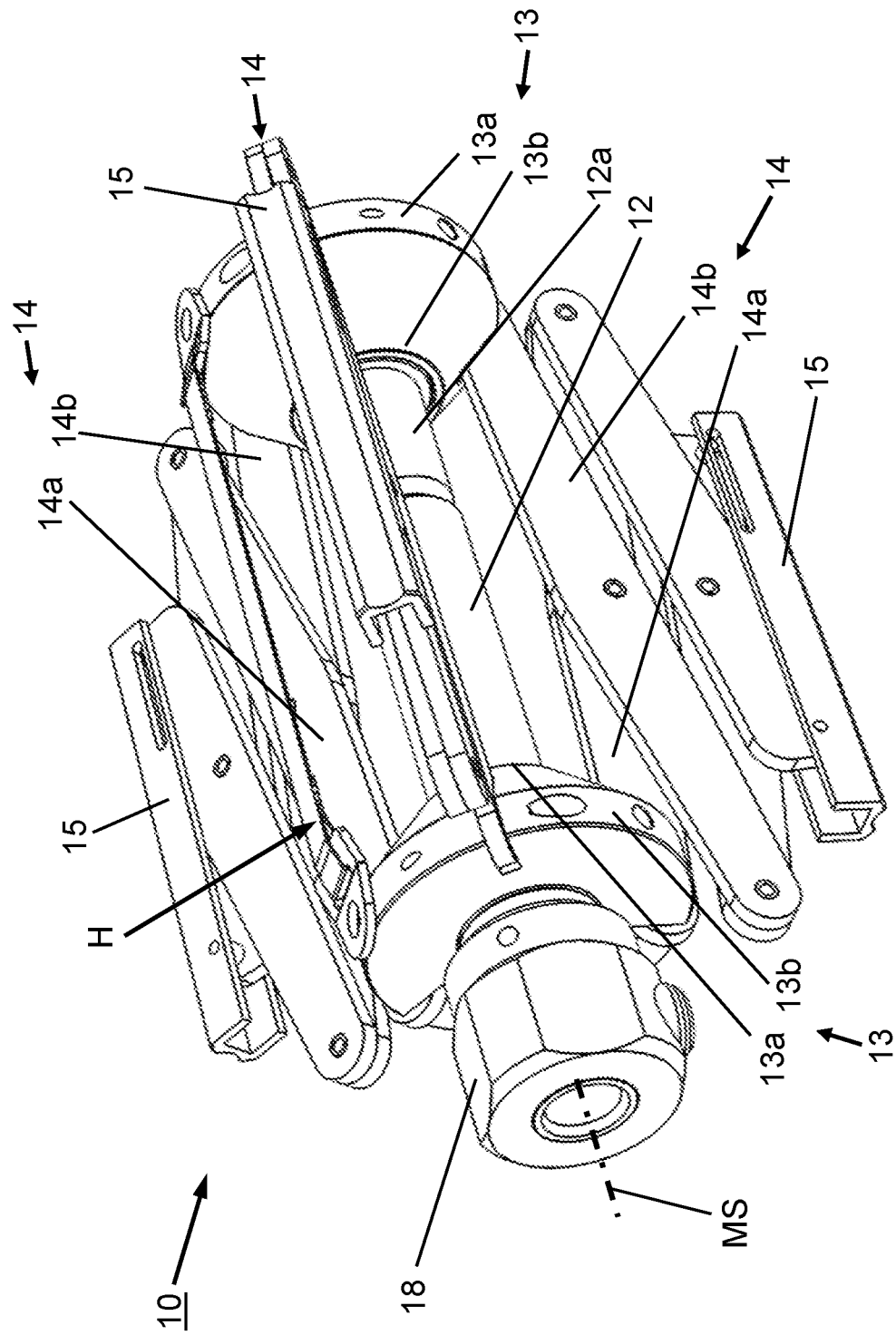
FIG. 8 shows a schematic perspective view of a first embodiment of a clamp assembly for the inventive skiving apparatus according to the embodiments in FIGS. 1 and 3, the clamp assembly being shown in the transportation state, i.e., in the folded state.

FIG. 8 shows the clamp assembly 10 according to FIGS. 1, 3 and 4. Clamp assembly 10 comprises support sleeves 12 with the nut 18 which is attached to the left-hand end in FIG. 6 and fixedly connected to support sleeve 12. The first flange 13 is axially fixed on the left-hand end of support sleeve 12, but it is disposed rotatably about the center axis of support sleeve 12, which is oriented coaxially with the center axis MS of clamp assembly 10. The second flange 13 is disposed axially movably on the right-hand end of support sleeve 12. In the region of its right-hand end, support sleeve 12 has the external thread 12a which co-operates with the matching internal thread of the second flange 13.

Flanges 13 are substantially conical in shape, with a base 13a and a tapering cone end 13b, wherein the center axis of flange 13 is oriented coaxially with the center axis of support sleeve 12. The tapering cone ends 13b face one another. At its outwardly facing base 13b of larger diameter, the pairs of hingedly connected claw members 14a, 14b of clamp claws 14 are hingedly arranged in such a way that they are pivotable about an axis perpendicular to the center axis MS of clamp assembly 10.

Approximately U-shaped supporting elements 15, which are oriented in their longitudinal extension at least approximately parallel to the center axis MS of clamp assembly 10 and which face the center axis MS of clamp assembly 10 with their open side, are disposed at the outer ends of the outer claw members 14a, 14b of clamp claws 14. Supporting elements 15 stay in this orientation due to their hinged connection to the one claw member 14a, 14b and their connection through an elongate hole to the respective other claw member 14b, 14a. When skiving apparatus S is in its operational, i.e., mounted, state, supporting elements 15 abut against the inner side of tubular body R.

A holding member H in the form of a holding strap is also attached to the clamp assembly 10 of FIG. 6. The holding member or holding strap H is fixed by its ends to the base 13a of flange 13 approximately in the middle between two adjacent clamp claws 14. The length of holding strap H is selected such that it is tensioned between flanges 13 when clamp assembly 10 is in the relaxed state shown in FIG. 6, in which flanges 13 reach their maximum distance from each other.

In addition to making it easier to handle skiving apparatus S when inserting it into a tubular body R or when removing skiving apparatus S from it, holding strap H can also serve as a limit for the maximum possible extent to which clamp assembly 10 can be folded together.

As an alternative to a flexible strap, a fixed handle can be used as holding member H, which is fixed, for example, by one end to one of flanges 13 and extends with its second end in the direction of the second flange 13. Similarly to supporting element 15, such a fixed handle could be connected via an elongate hole in the region of its other end to the second flange 13, as a result of which the mobility of the two flanges 13 is retained, whereas the handling of clamp assembly 10 can be improved.

Figure 9:
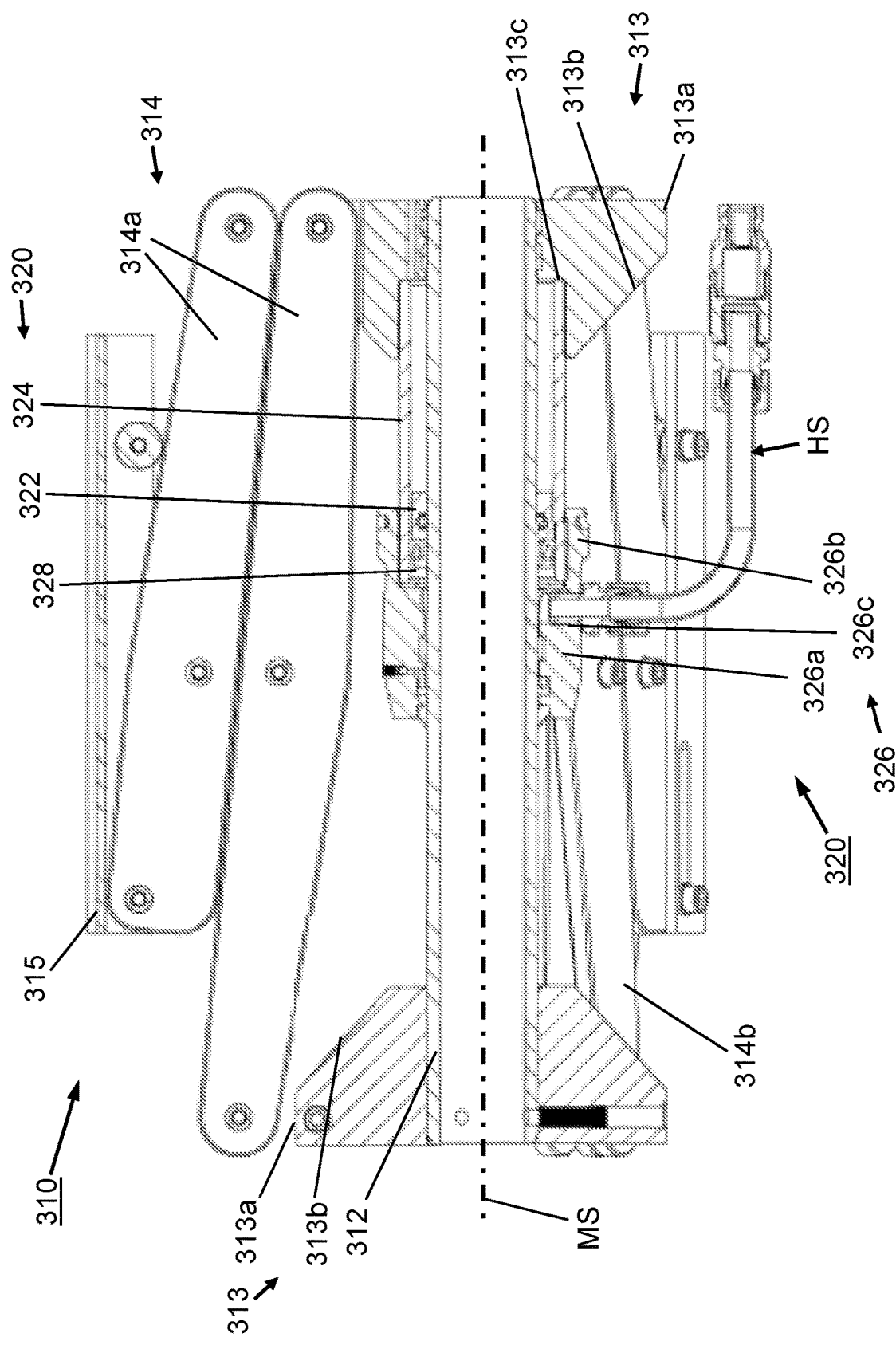
FIG. 9 shows a cross-sectional view of a second embodiment of a clamp assembly according to the invention, in a plane through its center axis.

FIG. 9 is a cross-sectional view of a second embodiment of a clamp assembly 310 according to the invention, having a center axis MS.

Clamp assembly 310 includes a mandrel or support sleeve 312 designed as a hollow shaft, with a first flange 313 which is mounted and fixedly connected to support sleeve 312 at its left-hand end, in FIG. 9. At the right-end, in FIG. 9, of support sleeve 312, a second flange 313 is disposed axially displaceably on support sleeve 312. Support sleeve 312 is disposed coaxially with the center axis MS of clamp assembly 310.

The substantially conically shaped flanges 313 have a base 313a and a tapering cone end 313b facing toward the center of support sleeve 312. At its outwardly facing base 313b of larger diameter, pairs of hingedly connected claw members 314a, 14b of clamp claws 314 are hingedly arranged in such a way that they are pivotable about an axis perpendicular to the center axis MS of clamp assembly 310. Clamp claws 314 have the same structure and manner of operation as the clamp claws 14 of clamp assembly 10.

Approximately U-shaped supporting elements 315, which are oriented in their longitudinal extension at least approximately parallel to the center axis MS of clamp assembly 310 and which face the center axis MS of clamp assembly 310 with their open side, are disposed at the outer ends of clamp claws 314. They are hingedly connected to the one claw member 314a, 314b and, via an elongate hole, to the respective other claw member 314b, 314a and as a result they remain in that orientation while clamp claws 314 are being operated. When the skiving apparatus is in its operational, i.e., mounted, state, supporting elements 315 abut against the inner side of tubular body R.

Clamp assembly 310 has an operating mechanism 320 for operating clamp claws 314. Operating mechanism 320 includes a piston/cylinder mechanism comprising an annular piston 322 arranged axially fixedly on the hollow shaft or support sleeve 312, and a sleeve-shaped cylinder 324 arranged on support sleeve 312 coaxially with the center axis MS of clamp assembly 310. Cylinder 324 rests fluid-tightly with its inner surface on the outer circumferential surface of piston 322 and is held displaceably in the axial direction.

Operating mechanism 320 also includes a sleeve-shaped connection member 326, comprising a connector section 326a and a fixing section 326b, which is disposed on support sleeve 312 coaxially with the center axis MS of clamp assembly 310.

The inner diameter of fixing section 326b of connection element 326, facing the right-hand end, in FIG. 9, of support sleeve 312, corresponds to the outer diameter of cylinder 324, the left-hand end of which is received in fixing section 326b and fixed thereto. The inner diameter of connector section 326a corresponds to the outer diameter of support sleeve 312, and is held displaceably thereon. Connector section 326a also has a connection bore 326c to which a fluid source, such as an hydraulic pump, can be connected via a fluid line HS, such as an hydraulic hose.

As can also be seen in FIG. 9, the right-hand flange 313 has a cylindrical recess 313c oriented coaxially with support sleeve 312 on its side facing operating mechanism 320, the diameter of which recess corresponds to the outer diameter of cylinder 324, and which protrudes into the right-hand end of cylinder 324, where it is fixed.

An annular cylinder chamber 328 is formed between piston 322 and the end face, facing piston 322, of connector section 326a of connection element 326, on the one hand, and the inner side of the left-hand end of cylinder 324 and the outer side of support sleeve 312 opposite that surface, on the other hand. Cylinder chamber 328 is in fluidic communication with connection bore 326c, such that a fluid pumped via fluid line HS enters cylinder chamber 328.

Flange 313, cylinder 324 and connection member 326 are securely and fluid-tightly connected to each other. If a fluid is pumped under pressure via fluid line HS into cylinder chamber 328, connection member 326 moves, with cylinder 324 and the right-hand flange 313 attached thereto, to the left in FIG. 9, thus expanding cylinder chamber 328. This movement of flange 313 operates clamp claws 314, which extend themselves radially outwards and brace clamp assembly 310 inside tubular body R. To remove clamp assembly 310 from tubular body R, it is sufficient to reduce the pressure on the fluid in cylinder 324 by allowing it to flow back into a reservoir provided for that purpose. This allows clamp claws 314 to be pressed together manually at least enough to allow clamp assembly 310 to be removed from tubular body R.

Reducing the pressure on the fluid in cylinder 324 can be done by operating a backflow valve. Such a backflow valve may be assigned to the fluid source, for example it may be disposed thereon. Alternatively, it is possible for such a backflow valve to be disposed on the operating mechanism 320 of clamp assembly 310 or to be part of fluid line HS.

Figure 10:
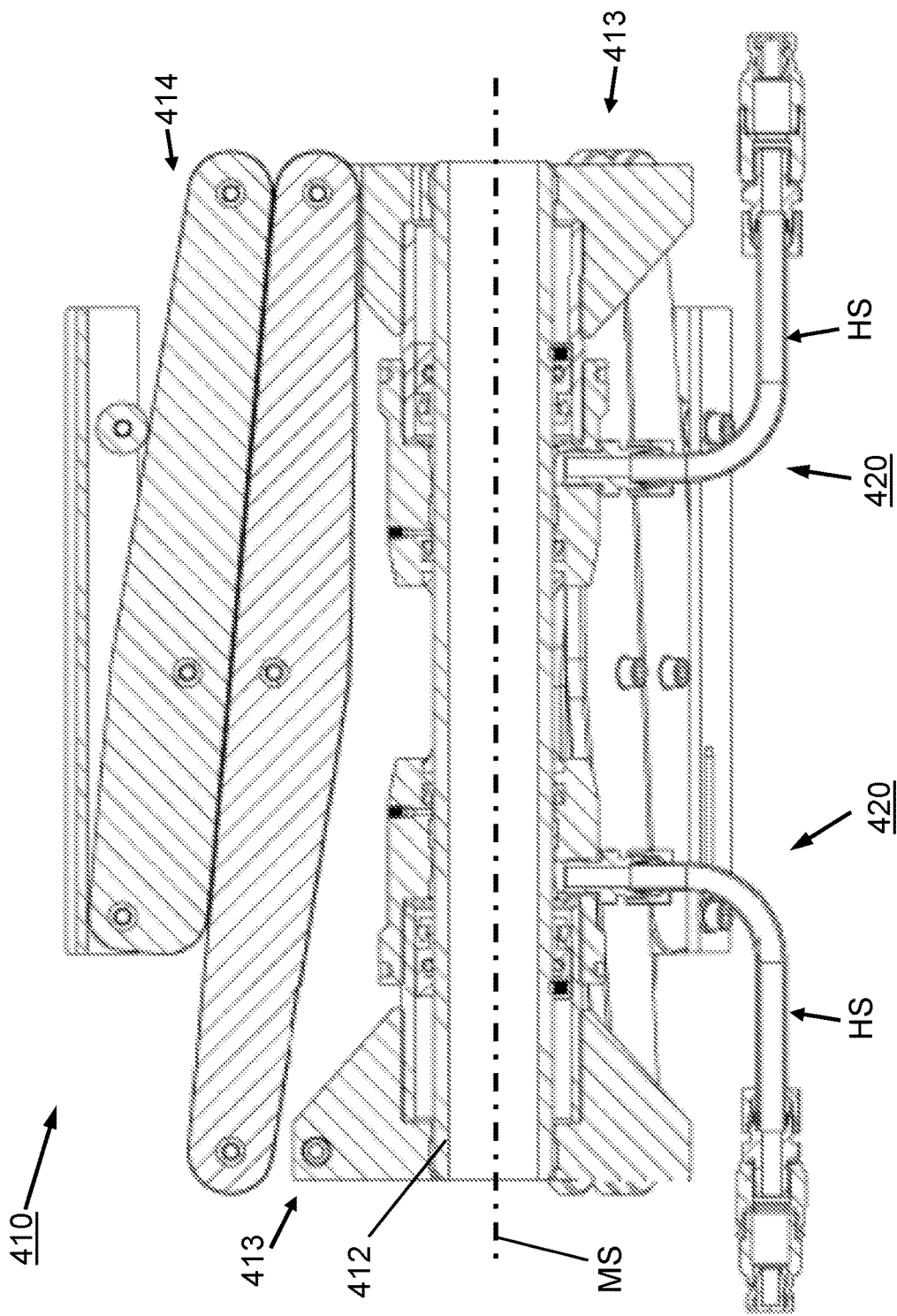
FIG. 10 shows a cross-sectional view of a third embodiment of a clamp assembly according to the invention, in a plane through its center axis.

FIG. 10 shows a cross-sectional view of a third embodiment of a clamp assembly 410 according to the invention.

Clamp assembly 410 comprises, like clamp assembly 310 according to FIG. 9, a hollow shaft or support sleeve 412 on the right-hand end of which, according to FIG. 10, a first flange 413 is displaceably disposed. There is also a first operating mechanism 420 disposed on support sleeve 412, which has the same structure as the operating mechanism 320 known from the clamp assembly 310 in FIG. 9.

In addition, clamp assembly 410 comprises a further operating mechanism 420, which is likewise disposed on support sleeve 412. This further operating mechanism 420 is identical in structure to the first operating mechanism 420 but in mirrored arrangement, and is connected to the left-hand flange 413 in FIG. 10. Clamp claws 414, which are identical to clamp claws 314 of clamp assembly 310, are disposed on flanges 413.

As can be seen in FIG. 10, both operating mechanisms 420 are connected to a fluid source via a fluid line HS. It is possible for both fluid lines HS to be connected to the same source, and to be selectively controlled either together or separately. The operating mechanisms can be operated simultaneously or one after the other.

Figure 11:
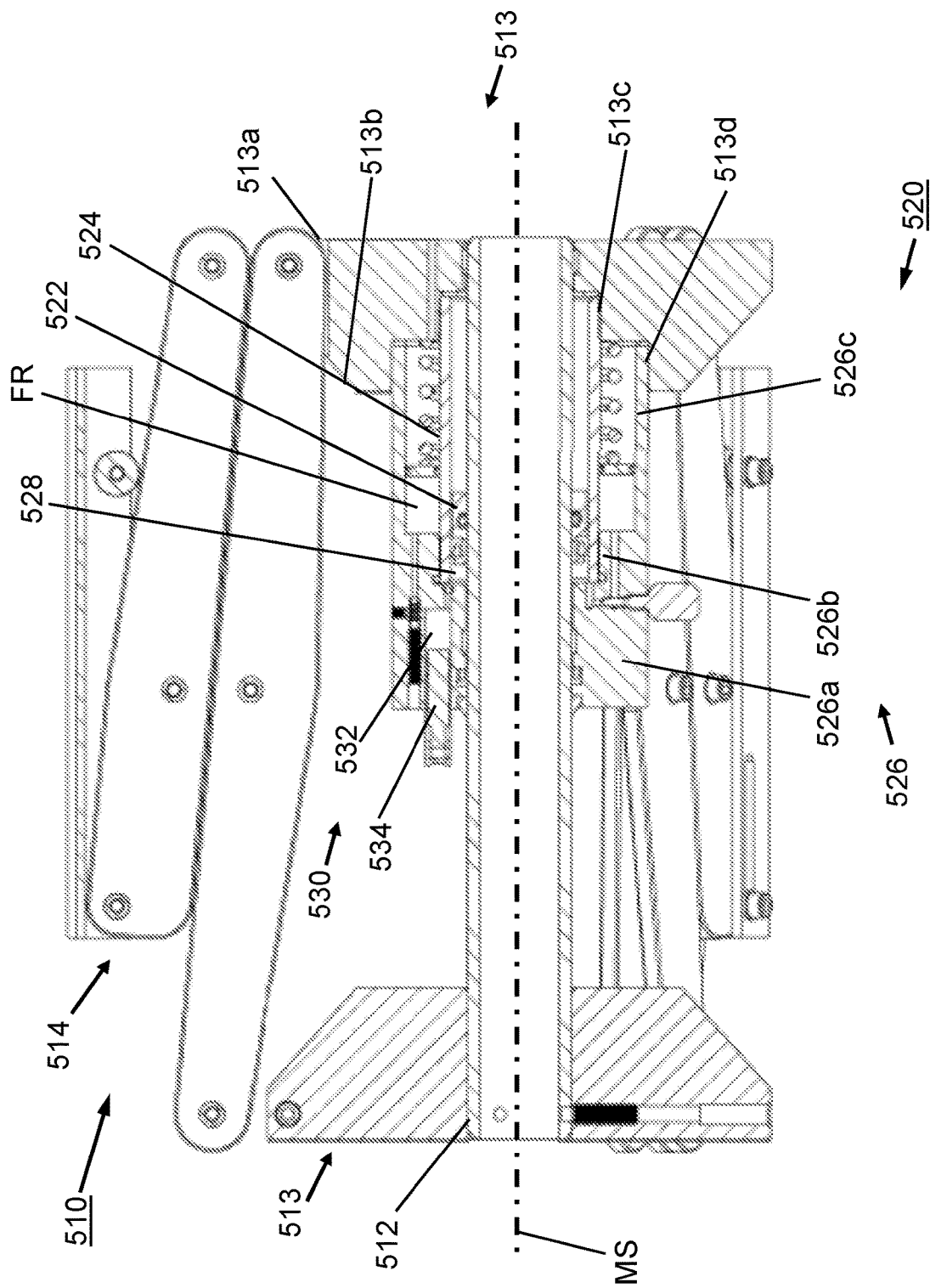
FIG. 11 shows a cross-sectional view of a fourth embodiment of a clamp assembly according to the invention, in a plane through its center axis.

FIG. 11 shows a cross-sectional view of a fourth embodiment of a clamp assembly 510 according to the invention.

This comprises a hollow shaft or support sleeve 512, on the right-hand end of which, in FIG. 11, a first flange 513 is disposed coaxially with support sleeve 512 and axially displaceable thereon. The first flange 513 has substantially the same structure as the first flange 312 according to the second embodiment of clamp assembly 310 according to FIG. 9. Like clamp assembly 310, clamp assembly 510 also has a second flange 513 fixedly disposed on the left-hand end, in FIG. 11, of support sleeve 512. Clamp claws 514, which are identical in structure and manner of operation to clamp claws 314 of clamp assembly 310, are disposed on flanges 512.

As can be seen in FIG. 11, clamp assembly 510 has an operating mechanism 520. Operating mechanism 520 includes a piston/cylinder mechanism comprising an annular piston 522 arranged axially fixedly on support sleeve 512, and a sleeve-shaped cylinder 524 arranged fluid-tightly on support sleeve 512 coaxially with the center axis MS of clamp assembly 510. Cylinder 524 rests fluid-tightly with its inner surface on the outer surface of piston 522 and is held displaceably in the axial direction.

Operating mechanism 520 also includes a sleeve-shaped connection member 526 disposed on support sleeve 512 coaxially with the center axis MS of clamp assembly 510, comprising a connector section 526a, a fixing section 526b and a cylinder sleeve the form of a tubular section 526c.

The inner diameter of fixing section 526b of connection element 526, facing the right-hand end, in FIG. 11, of support sleeve 512, corresponds to the outer diameter of cylinder 524, the left-hand end of which is received in fixing section 326b and fluid-tightly fixed thereto. The inner diameter of connector section 526a corresponds to the outer diameter of support sleeve 512, and is held displaceably thereon. Tubular section 526c is connected to the right-hand end, in FIG. 11, of fixing section 526b and extends in the direction of the right-hand flange 513. The inner diameter of cylinder sleeve or tubular section 526c is larger than the outer diameter of cylinder 524.

As can also be seen in FIG. 11, the right-hand flange 513 has a first cylindrical recess 513c on its side facing operating mechanism 520, the diameter of which recess corresponds to the outer diameter of cylinder 524, and which protrudes into the right-hand end of cylinder 524, where it is fixed.

An annular cylinder chamber 528 is formed between piston 522 and the end face, facing piston 522, of connector section 526a of connection element 526, on the one hand, and the inner side of the left-hand end of cylinder 524 and the outer side of support sleeve 512 opposite that surface, on the other hand.

Flange 513 has a second cylindrical recess 513d on its side facing operating mechanism 520, which recess is oriented coaxially with the first recess 513c, and the diameter of which recess corresponds to the outer diameter of tubular section 526c of connection element 526, which protrudes into the recess and is fixed therein.

Operating mechanism 520 also includes an integrated drive means for operating clamp assembly 520, as shall now be described with reference to FIG. 12, which shows an enlarged view of the operating mechanism 520 of clamp assembly 510 shown in FIG. 11.

The drive means of operating mechanism 520 includes a fluid pump 530 with a piston 532 that can be moved inside a cylinder 534. Cylinder 534 is disposed in connector section 526a of connection element 526 and extends parallel to the center axis MS of clamp assembly 520 from the left-hand end, in FIG. 12, of connection element 526 to the right into connector section 526a.

An annular cavity is formed between the outer surface of cylinder 524 of the piston/cylinder arrangement and the inner surface of tubular section 526c. An annular piston 540 which is slidably seated on the outer surface of cylinder 524, and the outer circumferential surface of which abuts against the inner surface of tubular section 526c of connection element 526, is disposed inside the cavity. Annular piston 540 divides the annular cavity. A fluid reservoir FR is formed on the side of annular piston 540 facing fluid pump 530.

Via channels disposed in connection member 526, the fluid reservoir or reservoir FR is in fluid communication with the cylinder 532 of fluid pump 530 and with annular cylinder chamber 528. Nonreturn valves 537, in the form of spring-loaded ball check valves that prevent backflow of fluid through channels 536 into reservoir FR, are disposed in channels 536.

In connection member 536 there are further channels 538, which connect annular cylinder chamber 528 to reservoir FR. A backflow valve that allows fluid to flow back from annular cylinder chamber 528 into reservoir FR is disposed in channels 538.

Figure 12:
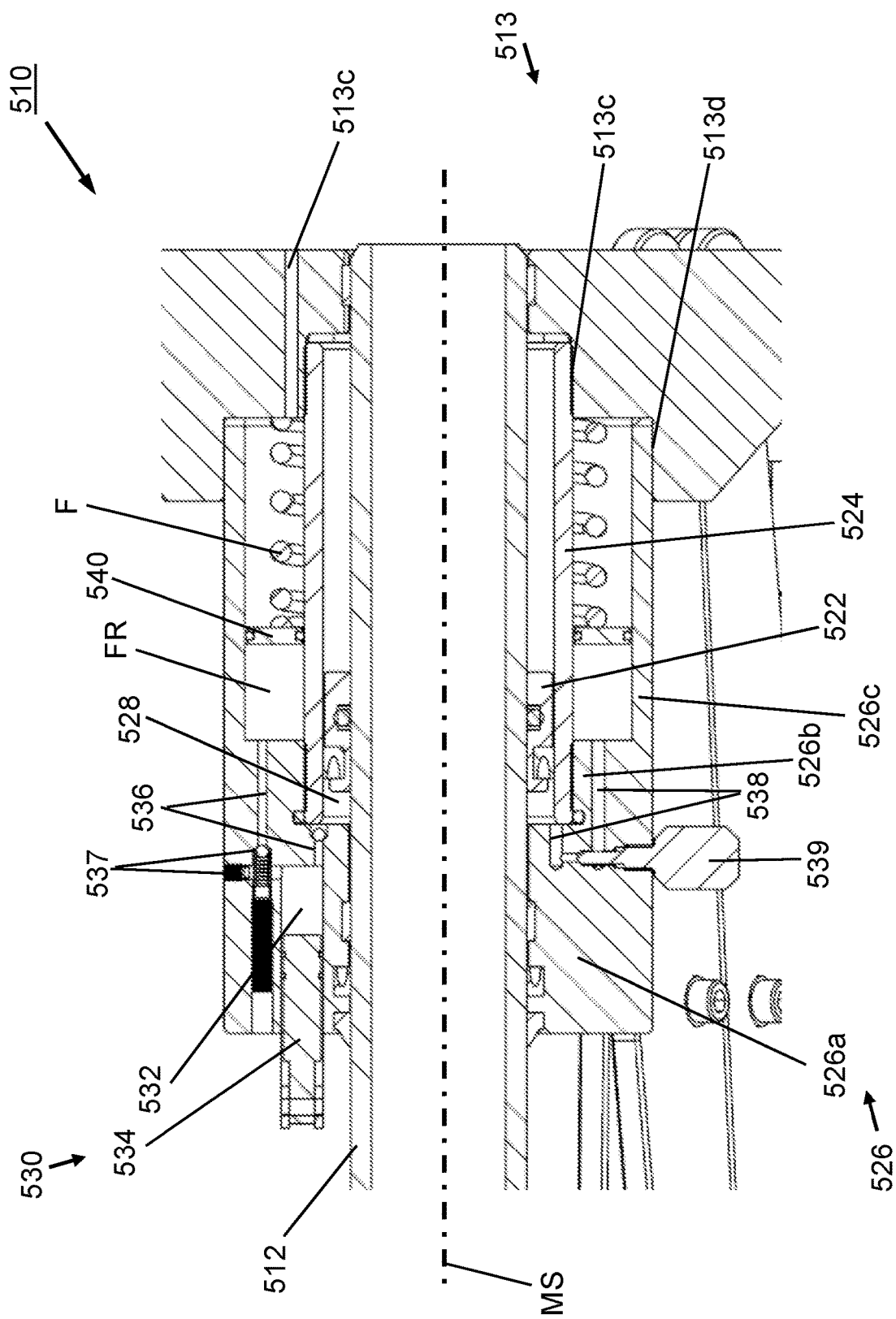
FIG. 12 shows an enlarged view of the operating mechanism of the clamp assembly according to FIG. 11.

In the cavity between the outer surface of cylinder 524 of the piston/cylinder arrangement and the inner surface of tubular section 526c, a spring element F in the form of a helical compression spring is arranged on the right-hand side, in FIG. 12, of annular piston 540. Spring element or spring F is disposed coaxially on cylinder 524 and produces a force that acts in the axial direction on annular piston 540. The annular cavity on the right of annular piston 540 is in communication with the atmosphere via a corresponding vent hole 513e in flange 513.

Figure 13:
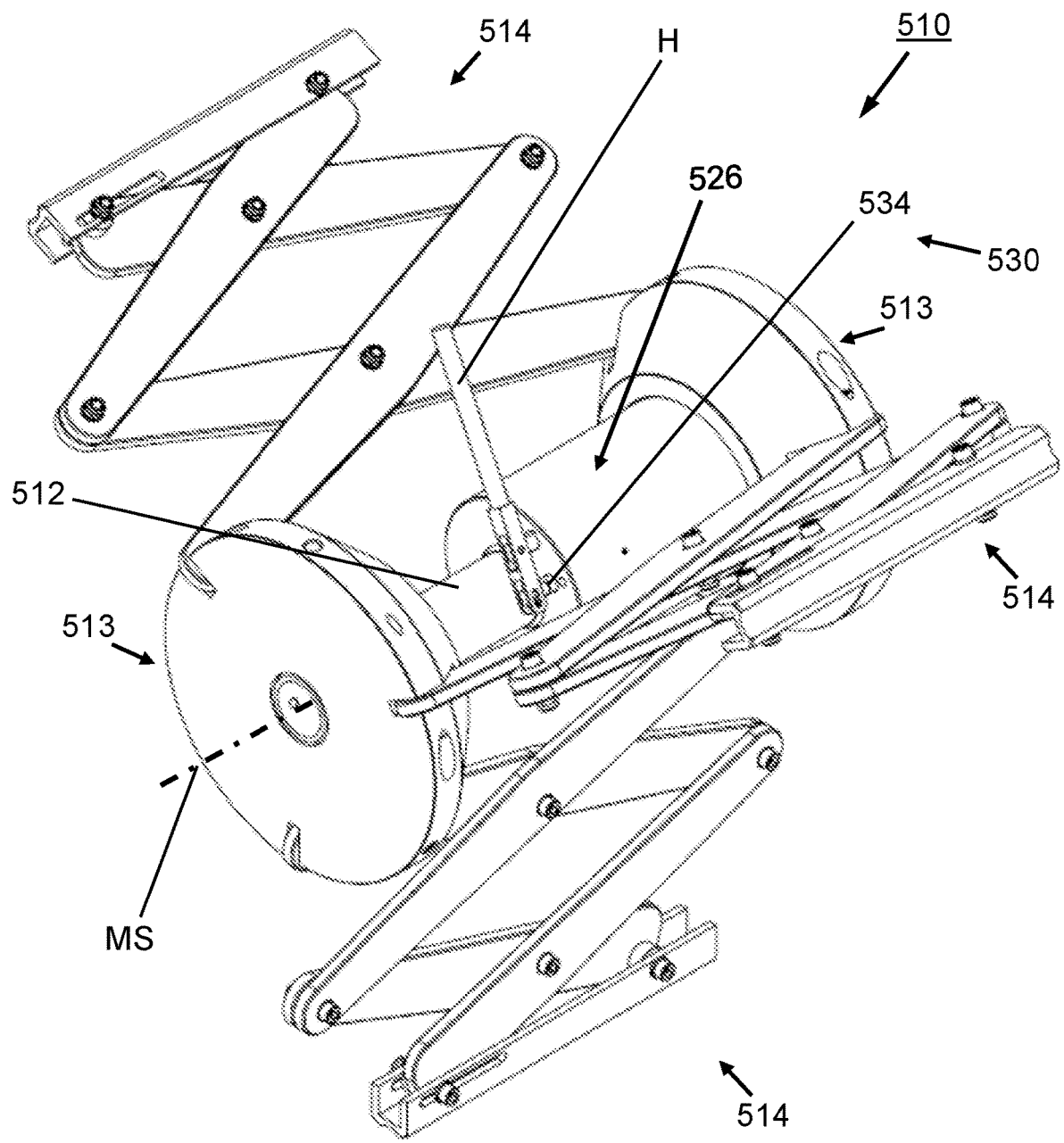
FIG. 13 shows a schematic perspective view of the clamp assembly according to FIG. 11.

The fluid pump 530 of clamp assembly 510 is manually operated. A lever H is provided for that purpose, as shown in FIG. 13, which shows a schematic perspective view of clamp assembly 510. Lever H is hingedly attached to the front end of connection element 526 facing to the left in FIG. 13, and is connected at its bottom end to piston 534 of fluid pump 530 such that piston 534 can be moved reversibly back and forth in cylinder 532 by operating lever H.

Figure 14:
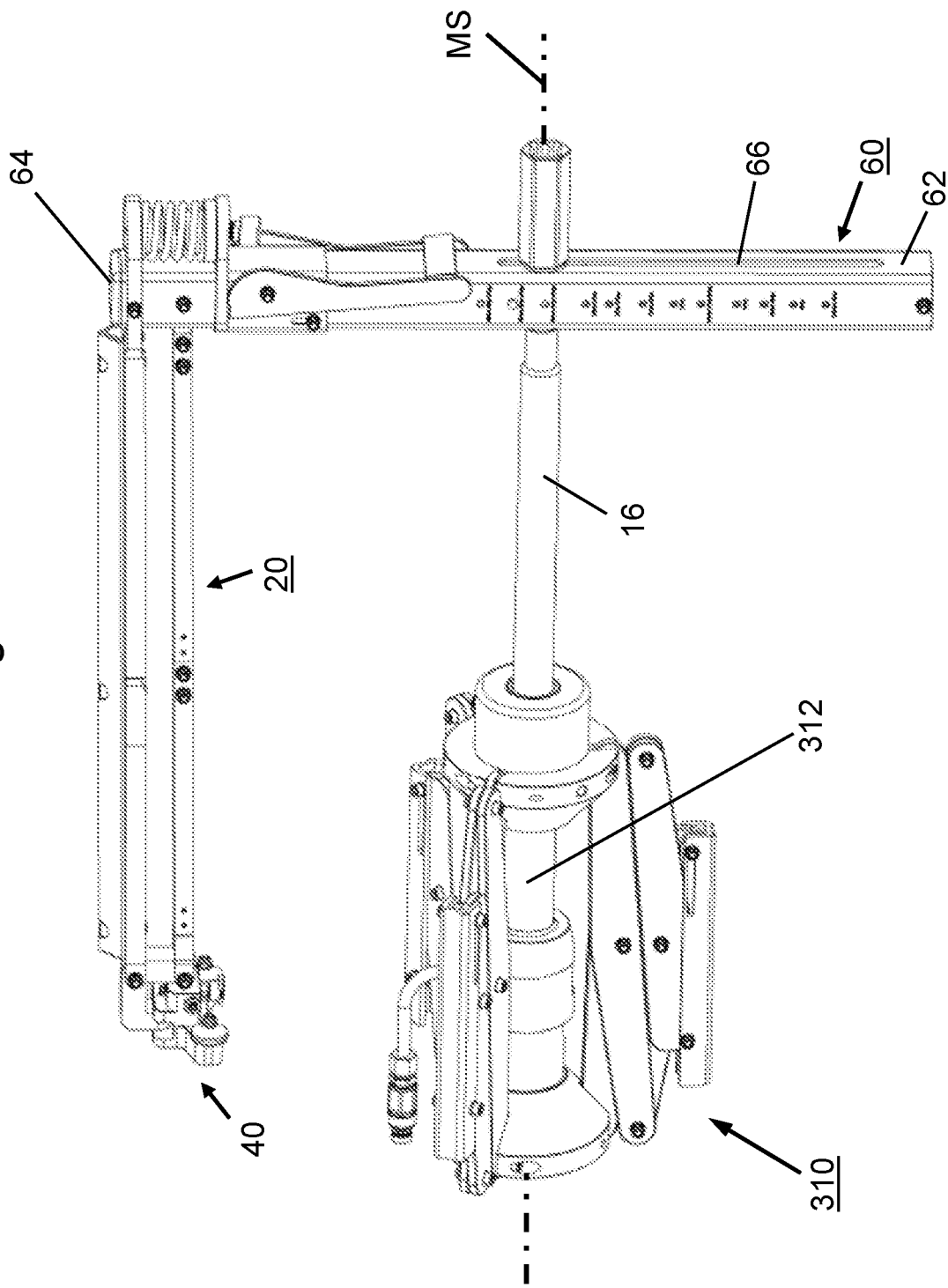
FIG. 14 shows a schematic perspective view of a skiving apparatus with a skiving assembly according to FIG. 3 and a clamp assembly according to FIG. 9.

FIG. 14 is a schematic perspective view of a skiving apparatus comprising a skiving assembly according to FIG. 3 and a clamp assembly according to FIG. 9.

As can be seen in FIG. 14, a spindle such as threaded spindle 16 extends through the hollow shaft or support sleeve 312 of clamp assembly 310 and protrudes from the right-hand end, in FIG. 14, of clamp assembly 310. The right-hand end of spindle 16 extends through the elongate hole 66 of skiving arm support 60, which is fixed thereto. Skiving assembly 20 with skiving knife arrangement 40, which extends at least approximately parallel to the center axis MS of clamp assembly 310, is mounted on the second end 64 of skiving arm support 60. As can also be seen in FIG. 14, skiving arm support 60 can also be provided by markings arranged along elongate hole 66 and which indicate the attachment position of the skiving arm support 160 on clamp assembly 310 in relation to the diameter of a tubular body R to be machined.

In order to remove material with the aid of skiving apparatus S from the surface of a tubular body R, for example a plastic pipe, clamp assembly 10 is firstly positioned and braced inside tubular body R in such a way that the center axis MS of clamp assembly 10 is oriented at least approximately coaxially with the center axis MR of tubular body R.

Threaded spindle 16, with skiving arm support 60 and skiving arm unit 30 attached thereto is then inserted into support sleeve 12 so that skiving knife arrangement 40 is positioned radial above the section of tubular body R to be skived. A locking device which prevents any unintentional axial displacement of the threaded spindle may be provided on support sleeve 12 or nut 18.

The connection between skiving arm support 60 and the left-hand end 16a of threaded spindle 16 is then released, if this has not already been done. Skiving arm support 60 can now be moved, at end 16a of threaded spindle 16, along elongate hole 66 until skiving assembly 20 or the knife carriage 42 of skiving knife arrangement 40 rests with its support rollers 46 on tubular body R, and skiving arm elements 32, 34 of skiving arm unit 30 are oriented at least approximately parallel to the center axis MR of tubular body R. Skiving arm support 60 is then fixed in this position on threaded spindle 16.

In this position, knife carriage 42 of skiving knife arrangement 40 may already be resting on the tubular body with a small biasing force. To increase this biasing force, spring element 54 is now compressed further.

In the first embodiment according to FIGS. 1 and 2, spring element 54 is biased by moving pressure plate 52, manually, for example, in the direction of the second end 64 of skiving arm support 60. Skiving arm unit 30 is not yet in the skiving position shown in FIG. 1, i.e., spring element 54 is in an unbiased state. The skiving arm unit is then placed on tubular body R and spring element 54 is biased further. Due to the force exerted by elastic element 54 on pressure plate 52, pressure plate 52 tilts against skiving arm support 60 and is thus secured against slipping. In addition, a clamp (not shown) may be provided, which secures pressure plate 52 in its position on skiving arm support 60, e.g., against unintentional displacement during any changes in load that may occur.

In the second embodiment according to FIGS. 3 to 5, clamping lever 84, which is located in the open position shown in FIG. 3 prior to the skiving assembly 20 being brought close to the surface of tubular body R, is brought into the biased position shown in FIG. 4, with the result that pressure plate 72 is moved in the direction of the second end 64 of skiving arm support 60.

The force produced by the force application unit or biasing means 50, 70, with which knife carriage 42 is pressed onto the surface of tubular body R, should be greater than the force with which skiving knife 44 is pressed by the spring element in knife carriage 42 against the surface of the pipe, so as to prevent knife carriage 42 from lifting off tubular body R. This ensures that any ovalities of tubular body R are compensated for reliable manner and that skiving knife 44 rests on tubular body R with a constant force.

When a skiving apparatus in the third or fourth embodiment according to FIG. 6 or 7 is used, skiving arm support 160 can be attached to spindle 16 in the same manner. In order to fix the position of skiving arm support 160 on spindle 16, it is provided with markings arranged along elongate hole 166 and which indicate the attachment position of skiving arm support 160 on the clamp assembly in relation to the diameter of a tubular body R to be machined. Spindle 16 can thus be attached in a simple manner at the marking corresponding to the diameter of the tubular body R to be machined.

In order to adjust the force applied by skiving knife 144 of knife assembly 140 onto the surface of tubular body R, adjusting screw 152 of the force application unit or biasing unit 150 is operated. By turning adjusting screw 152 out of the second end 164 of skiving arm support 160, the spring 154 acting on the first end 134a of skiving arm element 134 is relaxed. This allows skiving knife assembly 140 to advance in the direction of the surface of tubular body R, but radial spring-back requires less force than when a spring F is strongly biased. If, in contrast, spring F is further tensioned by screwing the adjusting screw into skiving arm support 160, a greater force is necessary for any further compression.

In order to remove material from the surface of tubular body R, skiving apparatus S with skiving assembly 20 is rotatingly driven around tubular body R. This can be done manually, for example if a handle is provided in the region of the second end 64 of skiving arm support 60. Alternatively, it is possible for skiving apparatus S to be driven by means of a ratchet or by an electrical device such as a cordless screwdriver or power drill, which can be attached by means of a suitable adapter to the attachment point of threaded spindle 16 on skiving arm support 60.

In order to produce an axial feed for knife carriage 42, the position of skiving assembly 20 along the center axis MS of clamp member 10 or the center axis R of tubular body R can be adjusted or changed. This can be done in steps or continuously. When the axial feed of knife carriage 42 is performed in steps, care must be taken to ensure that the feed length is equal at most to the width of skiving knife 44, in order to obtain uniform removal of material in the axial direction. If the axial feed is continuous, it should likewise correspond at most to the width of skiving knife 44 for one revolution of skiving assembly 20 around tubular body R.

An axial feed in steps can be obtained by loosening the connection between skiving arm support 60 and threaded spindle 16 after each revolution of skiving assembly 20 around tubular body R, and by moving skiving arm support 60 on threaded spindle 16 by an appropriate amount along the center axis MR of tubular body R and then fixing it in place again.

To obtain a continuous feed, threaded spindle 16 may be screwed a desired length into or through clamp assembly 10 with each revolution of skiving assembly 20 around tubular body R. Clamp assembly 10 may have a corresponding threaded bush that receives threaded spindle 16.

Alternatively, skiving arm support 60 may be mounted radially fixedly but rotatably on end 16a of spindle 16, relative to the center axis MS of clamp assembly 10. In this configuration, threaded spindle 16 is manually screwed a desired length into or through clamp assembly 10 after each revolution of skiving assembly 20 around tubular body R.

Skiving apparatus S according to the invention may also be fitted with a clamp assembly 310, 410, 510, whose manner of operation shall now be described.

Clamp assembly 310 according to the second embodiment described with reference to FIG. 9 is inserted coaxially into tubular body R to be machined. A pressurized fluid, such as hydraulic oil, is pumped into annular cylinder chamber 328 via a fluid line HS connected to operating mechanism 320. The pressurized fluid moves connection member 326 axially away from the piston 322 mounted fixedly on support sleeve 312. Via cylinder 324 fixedly connected to connection member 326, flange 313, which is likewise connected fixedly to cylinder 324, is also moved on support sleeve 312. Flanges 313 come closer to each other as a result, and clamp claws 314 are operated. In the process, supporting elements 315 are moved radially away from the center axis MS of clamp assembly 310 until they abut against the inner side of tubular body R and brace clamp assembly 310 therein.

Clamp assembly 410 according to FIG. 10 includes two operating mechanisms 420. These function in the same way as the operating mechanism 320 of clamp assembly 310. Operating mechanisms 420 of clamp assembly 410 can be operated individually, with the result in each case that only one of flanges 413, as described with reference to FIG. 9, is moved on support sleeve 312. It may be sufficient to activate only one of operating mechanisms 420. However, it is also possible to activate both operating mechanisms 420 one after the other. It is also possible, in addition, to activate both operating mechanisms 420 simultaneously in order to brace clamp assembly 410 inside tubular body R to be machined.

To remove clamp assemblies 310, 410 from tubular body R, the pressurized fluid is relieved of the pressure by allowing it to flow back into the fluid source. Clamp claws 314, 414, which are relaxed in this way, can be pushed together manually.

To brace clamp assembly 510 according to the fourth embodiment described with reference to FIGS. 11 and 12, clamp assembly 510 is held coaxially inside tubular body R to be machined. To operate clamp claws 514, lever H is moved back and forth, thus operating fluid pump 530. By means of the latter, fluid such as hydraulic oil is pumped out of fluid reservoir FR via channels 536 into annular cylinder chamber 528. The nonreturn valves 537 disposed in channels 536 prevent any backflow of pressurized fluid into reservoir FR while the clamp assembly 510 is being braced. The pressurized fluid moves connection member 526 axially away from the piston 522 mounted fixedly on support sleeve 512. Together with connection member 526 and cylinder 524 fixedly connected thereto, flange 513 is also moved on support sleeve 512. As a result, clamp claws 514 are activated and clamp assembly 510 is braced inside tubular body R. To release clamp assembly 510 from tubular body R, backflow valve 539 is activated, thus allowing the pressurized fluid in annular cylinder chamber 528 to flow back into fluid reservoir FR via channels 538. Clamp claws 514 can be manually compressed to remove clamp assembly 510 from tubular body R.

Depending on the respective amount of fluid that is removed from or returned to it, fluid reservoir FR changes in size during the bracing or relaxing of clamp assembly 510, and annular piston 540 is also moved accordingly. Spring F acting on the side of annular piston 540 facing away from fluid reservoir FR prevents annular piston 540 from tilting and air from entering the hydraulic system.

The clamp assemblies 310, 410, 510 described with reference to FIGS. 9 to 12 are fluid-operated. It is therefore understood that appropriate seals which prevent any undesired escape of fluid, or any equally undesired entry of outside air into the fluid system, are provided between those elements, of the assemblies which come into contact with the fluid, that are movable relative to each other.

In the embodiments shown in FIGS. 1 to 7, skiving arm support 60, 160 is shown with a substantially square cross-section. It is possible, of course, for skiving arm support 60, 160 to have a cross-section which differs from that, for example a square, triangular or round cross-section.

In addition to skiving arm support 60, 160 being fixed in the manner described above to end 16a of threaded spindle 16, additional form-fitting means corresponding to the cross-sectional shape of skiving arm support 60, 160, such as sleeves or clamps that prevent any tilting of skiving arm support 60, 160 against threaded spindle 16, may be provided to further stabilize skiving arm support 60, 160 and above all to prevent any undesired twisting of skiving arm support 60, 160 about an axis in its longitudinal extension.

According to the invention, a further pressure plate disposed between the first end 34a of skiving arm element 34 and elastic element 54 may be provided at the second end 64 of skiving arm support 60, as an alternative or in addition to pressure plate 52, 72. Guide/securing member 56, 76 is arranged on this further pressure plate. A spindle or similar element which acts upon this pressure plate may also be mounted on the first end 34a of skiving arm element 34 and can be moved, for example by means of a suitable knob, in order to move the pressure plate in the direction of elastic element 54 so as to make a further adjustment of the biasing force. In principle, all the elements of the skiving apparatus according to the invention can be made of a suitable metal, such as steel or aluminum, in order to ensure the required strength. Individual elements that must have a lower strength, or which come directly into contact with the tubular body to be machined, in particular a plastic pipe, without having to machine it, such as the support rollers of the knife arrangement or the outermost elements of the clamp claws, may be made of a suitable plastic so as not to damage those elements.

As described with reference to FIG. 8, the second flange 13 has an internal thread which co-operates with a corresponding external thread on the right-hand end of support sleeve 12 in order to move flange 13 in the axial direction on support sleeve 12 for bracing and relaxing clamp claws 14. However, the axial mobility of second flange 13 can also be realized by other means. For example, the right-hand side of support sleeve 12 can be designed as a hydraulic or pneumatic piston on which the second flange 13, designed as an hydraulic or pneumatic cylinder, can be reversibly moved by means of a corresponding hydraulic or pneumatic pump.

A skiving apparatus S according to the invention comprises a clamp assembly, a skiving arm support and a skiving assembly having a skiving arm unit. It is possible to combine each clamp assembly 10, 310, 410, 510 with each of the skiving arm supports 60,160 and with each of the skiving arm units 30,130, 230.

It is also possible to use clamp assemblies 10, 310, 410, 510, in addition to a skiving tool, in general as tool holders for any kind of tool for machining an approximately tubular body, such as a pipe cutter or thread cutter. Depending on the type of tool, this can be mounted directly on clamp assembly 10, 310, 410, 510 or on skiving arm support 60,160.

Features and aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A skiving apparatus for at least partial removal of the surface of a tubular body having a center axis, comprising:
a clamp assembly having a center axis and at least one clamp member for clamping the skiving apparatus to the tubular body wherein, in a mounted state, the center axis of the clamp assembly coincides at least approximately with the center axis of the tubular body, and a skiving assembly comprising a skiving arm unit, a skiving knife arrangement disposed at a first end of the skiving arm unit and a skiving arm support with a first end and a second end, which connects the clamp assembly to the skiving arm unit, wherein the skiving arm unit is connected by a second end to the skiving arm support in such a way that the skiving arm unit and the center axis of the clamp assembly are in a common plane in the mounted state, wherein the skiving knife arrangement has a skiving knife, wherein the skiving arm unit is connected by its first and second ends to the skiving knife arrangement and the skiving arm support and is pivotable in the common plane with the center axis of the clamp assembly in such a way that the skiving knife arrangement keeps its orientation relative to the center axis of the clamp assembly in every pivoted position of the skiving arm unit.

2. The skiving apparatus according to claim 1, further comprising a force application unit for biasing the skiving arm unit in a skiving position in a direction in the common plane of the skiving arm unit and the center axis of the clamp assembly.

3. The skiving apparatus according to claim 1, wherein the clamp assembly has more than one clamp member.

4. A clamp assembly as a tool holder for a tool, such as a skiving knife arrangement of a skiving apparatus, for machining a tubular body having a center axis, the clamp assembly comprising:

a center axis, a mandrel arranged coaxially with the center axis of the clamp assembly, at least one clamping device disposed on the mandrel and directed substantially radially outwards, and an operating mechanism disposed on the mandrel, for operating the at least one clamping device for bracing the clamp assembly in the tubular body coaxially with its center axis.

5. The clamp assembly according to claim 4, wherein the at least one clamping device includes clamp claws comprising at least two claw members connected hingedly to each other and at least one clamp member disposed displaceably on the mandrel, to which one of the at least two claw members of the clamp claws is hingedly connected, and which is displaceable on the mandrel for operating the clamping device by the operating mechanism.

6. The clamp assembly according to claim 4, wherein the operating mechanism includes a thread engagement between the mandrel and the at least one clamp member, and an operating member.

7. The clamp assembly according to claim 4, wherein the operating mechanism includes at least one piston/cylinder mechanism which is disposed coaxially on the mandrel and which co-operates with the at least one clamp member.

8. The clamp assembly according to claim 7, wherein an annular cylinder chamber in which an annular piston is arranged is formed between the mandrel and a cylinder sleeve disposed coaxially on the mandrel.

9. The clamp assembly according to claim 8, wherein the cylinder sleeve can be displaced on the mandrel by the operating mechanism.

10. The clamp assembly according to claim 7, comprising a second clamp member which is displaceably disposed on the mandrel and which is connected hingedly to the second of the at least two claw members of the clamp claws, and a further piston/cylinder mechanism connected to the second clamp member.

11. The clamp assembly according to claim 7, wherein the operating mechanism has an integrated drive mechanism.

12. The clamp assembly according to claim 11, comprising a further cylinder sleeve disposed coaxially on the cylinder sleeve, for forming an integrated fluid reservoir between the cylinder sleeve and the further cylinder sleeve.

13. The clamp assembly according to claim 12, wherein the drive mechanism has a connection member which is disposed coaxially on the mandrel and which includes the further cylinder sleeve.

14. The clamp assembly according to claim 12, further comprising an integrated pump mechanism for transferring the fluid from the fluid reservoir into the cylinder chamber of the piston/cylinder mechanism, an integrated pump cylinder and a pump piston guided therein.

15. The clamp assembly according to claim 14, wherein the integrated pump mechanism has a lever for manual operation.

* * * * *